US011133907B2

(12) United States Patent
Interdonato et al.

(10) Patent No.: US 11,133,907 B2
(45) Date of Patent: Sep. 28, 2021

(54) DOWNLINK PILOT ASSIGNMENT IN MASSIVE MIMO

(71) Applicant: Telefonaktiebolaget LM Ericsson (publ), Stockholm (SE)

(72) Inventors: Giovanni Interdonato, Linköping (SE); Pål Frenger, Linköping (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/637,882

(22) PCT Filed: Sep. 27, 2018

(86) PCT No.: PCT/SE2018/050987
§ 371 (c)(1),
(2) Date: Feb. 10, 2020

(87) PCT Pub. No.: WO2019/066709
PCT Pub. Date: Apr. 4, 2019

(65) Prior Publication Data
US 2020/0220677 A1 Jul. 9, 2020

Related U.S. Application Data

(60) Provisional application No. 62/563,704, filed on Sep. 27, 2017.

(51) Int. Cl.
*H04B 7/0413* (2017.01)
*H04L 5/00* (2006.01)
(52) U.S. Cl.
CPC ......... *H04L 5/0048* (2013.01); *H04B 7/0413* (2013.01); *H04L 5/0053* (2013.01)

(58) Field of Classification Search
CPC . H04L 5/0048; H04L 5/0023; H04L 25/0224; H04L 25/0222; H04L 25/0226;
(Continued)

(56) References Cited

U.S. PATENT DOCUMENTS

2018/0026765 A1* 1/2018 Brent ....................... H04B 7/04
370/329

FOREIGN PATENT DOCUMENTS

| WO | 2016134744 A1 | 9/2016 |
| WO | 2017125152 A1 | 7/2017 |
| WO | 2018103897 A1 | 6/2018 |

OTHER PUBLICATIONS

Interdonato, G. et al., "How Much Do Downlink Pilots Improve Cell-Free Massive MIMO?", 2016 IEEE Global Communications Conference (GLOBECOM), Dec. 4, 2016, pp. 1-7, IEEE.
(Continued)

*Primary Examiner* — Rahel Guarino
(74) *Attorney, Agent, or Firm* — Sage Patent Group

(57) ABSTRACT

A network node (110) and a method for downlink pilot signal assignment and transmission, and for data transmission. The network node has a plurality of antenna elements distributed over an area. The network node determines a respective Channel State Information (CSI) and/or a respective channel hardening degree for a wireless device (120) based on an uplink pilot signal. Possibly, the network node determines a mobility condition for the wireless device. Based on one or more out of: the determined respective CSI, the determined respective channel hardening degree and the determined respective mobility condition, the network node obtains a pilot utility metric for the wireless device. Further, the network node assigns a downlink pilot signal to at least one wireless device having a pilot utility metric exceeding a predetermined threshold value. Furthermore, the network
(Continued)

node transmits, to the at least one wireless device, data and possibly an assigned downlink pilot signal.

20 Claims, 18 Drawing Sheets

(58) Field of Classification Search
CPC ............ H04L 25/0204; H04L 25/0206; H04L 25/0202; H04B 7/0626; H04B 7/0413; H04B 7/04; H04W 72/042; H04W 72/0413; H04W 74/006
See application file for complete search history.

(56) References Cited

OTHER PUBLICATIONS

Jayasinghe, P. et al., "Traffic Aware Pilot De-Contamination for Multi-Cell MIMO Systems", 2017 European Conference on Networks and Communications (EuCNC), Jun. 12, 2017, pp. 1-6, IEEE.
Ngo, H. et al., "Energy Efficiency Optimization for Cell-Free Massive MIMO", 2017 IEEE 18th International Workshop on Signal Processing Advances in Wireless Communications (SPAWC), Jul. 3, 2017, pp. 1-5, IEEE.
Interdonato, G., "Signal Processing Aspects of Cell-Free Massive MIMO", Linköping University Licentiate Thesis No. 1817, Jan. 1, 2018, pp. 1-49, Linköping University.
Ngo, H. Q. et al., "Massive MU-MIMO Downlink TDD Systems with Linear Precoding and Downlink Pilots", Fifty-first Annual Allerton Conference, Allerton House, UIUC, Illinois, USA, Oct. 2, 2013, pp. 293-298, IEEE.
Khansefid, A. et al., "Achievable Downlink Rates of MRC and ZF Precoders in Massive MIMO With Uplink and Downlink Pilot Contamination", IEEE Transactions on Communications, vol. 63, No. 12, Dec. 1, 2015, pp. 4849-4864, IEEE.

* cited by examiner

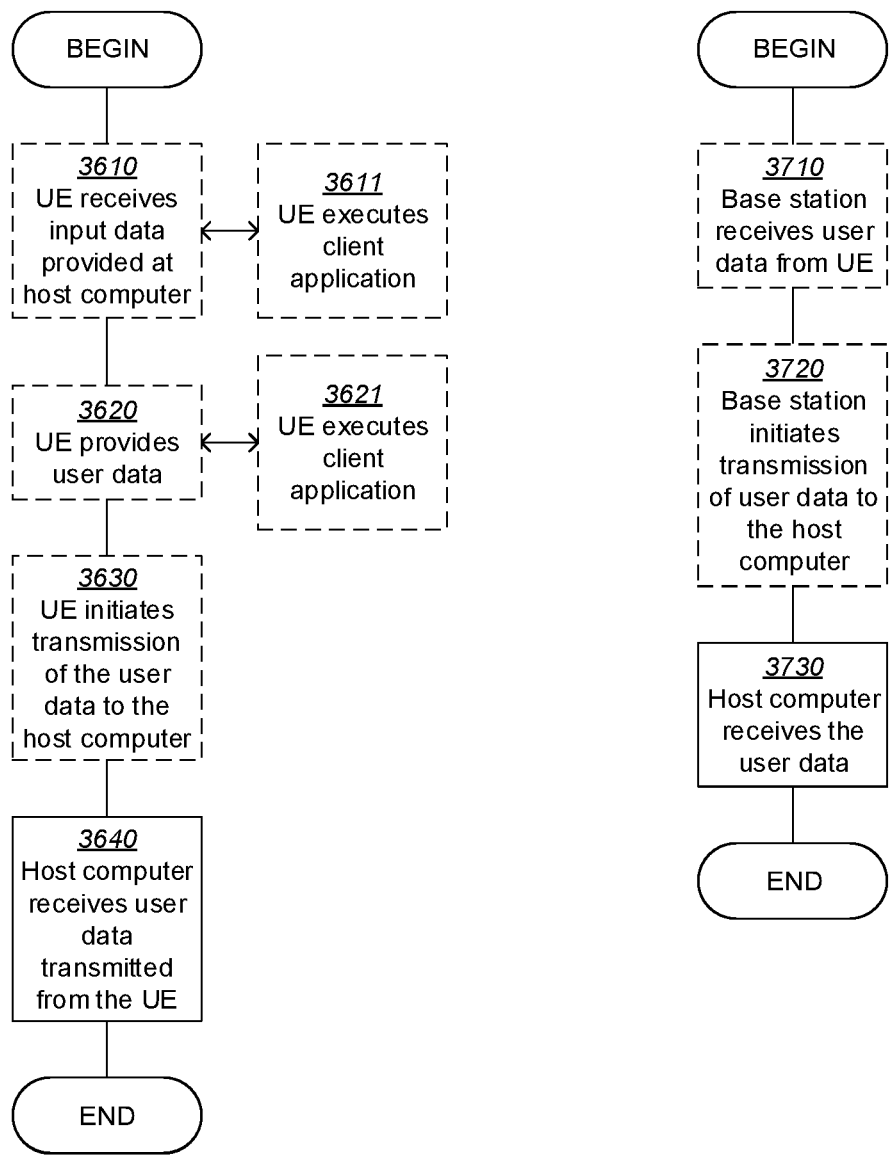

DOWNLINK PILOT ASSIGNMENT IN MASSIVE MIMO

TECHNICAL FIELD

Embodiments herein relate to a network node, a wireless device and to methods therein. Especially, embodiments herein relate to downlink pilot assignment and transmission, and to data transmission.

BACKGROUND

In a typical wireless communication network, wireless devices, also known as wireless communication devices, mobile stations, stations (STA) and/or User Equipments (UEs), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. The E-UTRAN/LTE is a variant of a 3GPP radio access network wherein the radio network nodes are directly connected to the EPC core network rather than to RNCs used in 3G networks. In general, in the E-UTRAN/LTE the functions of a 3G RNC are distributed between the radio network nodes, e.g. the eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antenna elements, which results in a Multiple-Input Multiple-Output (MIMO) communication channel. Such systems and/or related techniques are commonly referred to as MIMO.

Massive MIMO (maMIMO)

Massive MIMO, also known as large-scale antenna systems and very large MIMO, is a multi-user MIMO technology where each network node, e.g. each Base Station (BS), is equipped with a large number of antenna elements, which are being used to serve many wireless devices, e.g. terminals, in the same time-frequency resource and are separated in the spatial domain. By a large number of antenna elements is meant that the number of antenna elements is at least 50. An assumption is that there are many more BS antenna elements than terminals; at least twice as many, but ideally as many as possible. Massive MIMO offers many benefits over conventional multi-user MIMO. First, conventional multi-user MIMO is not a scalable technology, since it has been designed to support systems with roughly equal numbers of service antenna elements and terminals, and practical implementations typically relies on a Frequency-Division Duplex (FDD) operation. By contrast, in massive MIMO, the large excess of service antenna elements over active terminals and a Time Division Duplex (TDD) operation bring large improvements in throughput and radiated energy efficiency. These benefits result from the strong spatial multiplexing achieved by appropriately shaping the signals sent out and received by the base station antenna elements. By applying precoding to all antenna elements, the base station may ensure constructive interference among signals at the locations of the intended terminals, and destructive interference almost everywhere else. Furthermore, as the number of antenna elements increases, the energy may be focused with extreme precision into small regions in space. Other benefits of massive MIMO include the use of simple low-power components, the use of simple signal processing techniques, and reduced latency.

By operating in TDD mode, massive MIMO exploits the channel reciprocity property, according to which the channel responses are the same in both uplink and downlink. Channel reciprocity allows the BSs to acquire Channel State Information (CSI) from pilot sequences transmitted by the terminals in the uplink, and this CSI is then useful for both the uplink and the downlink. By virtue of the law of large numbers, the effective scalar channel gain seen by each terminal is close to a deterministic constant. This phenomenon is called channel hardening. Thanks to the channel hardening, the terminals may reliably decode the downlink data using only long-term statistical CSI, making much of the physical layer control signaling redundant. That is, there is no need for the terminals to acquire instantaneous CSI. This renders many of the conventional resource allocation concepts unnecessary and results in a simplification of the MAC layer. These benefits are some of the reasons for why massive MIMO has a central position in 5G discussions.

However, massive MIMO system performance is affected by some limiting factors. For example, channel reciprocity requires hardware calibration. In addition, the so-called pilot contamination effect is a basic phenomenon which profoundly limits the performance of massive MIMO systems. Ideally, every terminal in a massive MIMO system should be assigned an orthogonal uplink pilot sequence. However, the maximum number of orthogonal pilot sequences that can exist is upper-bounded by the number of samples in the channel coherence interval, which is equal to the product of the coherence time (in seconds) and the coherence bandwidth (in Hertz). Since this number is finite, or depending on propagation environments, even quite small, adoption of orthogonal pilots may be physically impossible. As a consequence, pilots must be reused across cells, or even within the home cell. This inevitably causes interference on the received pilots, among terminals which share the same pilot sequence. This interference degrades the eventual system performance.

To implement massive MIMO in wireless communications networks, two different architectures may be adopted:

A Centralized maMIMO (C-maMIMO) architecture, wherein all BS antenna elements are co-located in a compact array, as shown in FIG. 1. FIG. 1 schematically illustrates a centralized massive MIMO architecture. Sometimes this is referred to as a "conventional massive MIMO system".

A Distributed maMIMO (D-maMIMO) architecture, wherein the BS antenna elements are spread out over a large geographical area, in a well-planned or random-like fashion, as shown in FIG. 2. FIG. 2 schematically illustrates a distributed massive MIMO architecture. Sometimes this is referred to as a "cell-free massive MIMO system" and in this context the term "Access Point (AP)" may be used instead of "antenna element". Further, the terms "antenna" and "antenna element" may be used interchangeably. The APs are connected to a Central Processing Unit (CPU) through high-capacity backhaul links, e.g. fiber-optic cables.

In D-maMIMO, every antenna serves every user, e.g. every wireless device. The D-maMIMO architecture has great ability to spatially multiplex users and exactly control the interference that is caused to everyone. Herein, we focus on Distributed Massive MIMO systems operating in a TDD mode. Compared to the C-maMIMO, the D-maMIMO has the potential to improve both the network coverage and the energy efficiency, due to an increased macro-diversity gain. This comes at the price of higher backhaul requirements and the need for distributed signal processing.

Pilot Assignments in Massive MIMO

The time-frequency resources are divided into coherence intervals, e.g. frames, of length r symbols. Thus, each frame comprises r symbols. The coherence interval is the interval during which the channel may be reasonably viewed as time-invariant. The TDD coherence interval may be divided into three or four phases. For the UEs that are assigned with a downlink pilot, the TDD coherence interval consists of: (i) uplink training, e.g. uplink pilot transmission, (ii) downlink payload data transmission, e.g. DL data transmission, (iii) downlink training, e.g. downlink pilot transmission, and (iv) uplink payload data transmission, e.g. UL data transmission, cf. FIG. 3. FIG. 3 schematically illustrates an example of a frame structure with the DL training phase. For the UEs that are not assigned with a downlink pilot, the downlink training phase is not performed, cf. FIG. 4. FIG. 4 schematically illustrates an example of a frame structure without the DL training phase. Let $\tau_p$ be the number of symbols per coherence interval spent on transmission of pilots, given by $\tau_p = \tau_{ULp} + \tau_{DLp}$, where $\tau_{ULp}$ and $\tau_{DLp}$ are the number of symbols spent on transmission of uplink and downlink pilots, respectively. $\tau_{DL}$ is the number of samples per coherence interval spent on transmission of downlink payload data, and $\tau_{UL}$ the number of samples per coherence interval spent on transmission of uplink payload data. The symbol length of the coherence interval r is given by $\tau = \tau_p + \tau_{DL} + \tau_{UL}$, where $\tau_{DL} = \tau_{UL}$ (i.e., symmetric TDD).

In many practical systems, the pilot and data transmissions are interleaved in the time-frequency domain, as depicted schematically in FIG. 5. Assuming a time-frequency grid of resource elements, as in the 3GPP standards LTE and the upcoming 5G New Radio standard, it is noted that a "UL pilot" or a "DL pilot" may consist of several resource elements. In FIG. 5 both UL data as well as UL pilots are transmitted during the UL data and same for DL data. The data and pilot transmissions are typically interleaved in the time and frequency grid. In the example in FIG. 5 there are 10 UL pilots and 5 DL pilots, each consisting of 4 resource elements. Thus, there are 10 orthogonal UL pilots consuming 40 REs in the UL data (4×10). The DL data contains 5 pilots consuming 20 REs (4×5). If the UL and DL pilots are to be orthogonal and without interference, they cannot be used for data transmission by any other UE.

Typically, the assignment of UL and DL pilot resources is semi-static. This means that even when there is only a single UE active in a UL or DL data transmission the resource elements reserved for the UL/DL pilots cannot be used by the same UE in the same UL or DL data transmission. Adapting the amount of pilot resources in the UL and DL may be done but it requires a significant amount of control signaling which consumes radio resources and takes time. Since pilot resources consume REs from that DL or UL data that could otherwise be used for data transmission it is important to try to minimize the amount of pilot resources used.

As previously mentioned, the channel hardening property is a factor in C-maMIMO in order to eliminate the effects of small-scale fading. It comes as a consequence of the averaging incurred when many antenna elements are involved in phase-coherent beamforming. The spatial diversity obtained by sending a signal over multiple channels with independent realizations, using multiple antenna elements, reduces channel fading. The intuition is that the channel fluctuations average out over the antenna elements. The channel variations reduce as more antenna elements are added by virtue of the law of large numbers. Thanks to the channel hardening, the UE sees a channel that behaves almost deterministically, and it can reliably decode its data by using only long-term statistical CSI. Consequently, downlink training that facilitates the UEs to acquire instantaneous CSI is not needed in C-maMIMO. This is true under the assumption of low/moderate UE mobility. UEs with high mobility suffer from CSI aging, i.e., their performance is significantly affected by the CSI accuracy as their channel conditions change very quickly. Therefore, high-speed UEs, i.e. UEs moving with a high speed, need to be trained in the downlink to know the instantaneous CSI.

In contrast, due to different network topology, a D-maMIMO system generally exhibits a much lower degree of channel hardening than a C-maMIMO system. In D-maMIMO, the APs, i.e. the antenna elements, are distributed over a wide area, and many APs are very far from a given UE. Therefore, each UE effectively sees a smaller number of APs relative to the UE in a C-maMIMO system. Typically, only a few of the APs actually contribute to 95% of the power allocated a given UE. Since the channel hardening degree is proportional to the number of antenna elements effectively involved in the service of a given terminal, i.e. UE, in D-maMIMO, it is less pronounced. Therefore, statistical CSI knowledge at the UE side is not always sufficient, e.g. statistical CSI is less efficient, for signal detection and downlink training using downlink pilots is needed.

In the D-maMIMO literature, an existing solution to the problem of lack of channel hardening is to send downlink pilots, cf. FIG. 3. Each active UE then receives a downlink pilot from which it estimates the instantaneous CSI, that is, the effective downlink channel gain. Since the number of active UEs may exceed the number of samples that can be afforded for downlink pilots, the UEs cannot be assigned mutually orthogonal downlink pilots. Instead, pilot reuse throughout the service area will be required similar to the case of uplink pilots. Consequently, pilot contamination will result also on the downlink pilots.

SUMMARY

An object addressed by embodiments herein is how to improve performance in a wireless communications network.

According to an aspect of embodiments herein, the object is achieved by a method performed by a network node for downlink pilot signal assignment and transmission, and for data transmission. The network node has a plurality of antenna elements distributed over an area. The network node and at least one wireless device are operating in a wireless communications network.

The network node determines a respective Channel State Information (CSI), and/or a respective channel hardening degree for the at least one wireless device based on an uplink pilot signal received from the at least one wireless device.

The network node possibly determines a respective mobility condition for the at least one wireless device.

Based on one or more out of: the determined respective CSI, the determined respective channel hardening degree and the determined respective mobility condition, the network node obtains a respective pilot utility metric for the at least one wireless device.

The network node assigns a respective downlink pilot signal to at least one wireless device out of the at least one wireless devices having a respective pilot utility metric exceeding a predetermined threshold value.

Further, the network node transmits, to the at least one wireless device out of the at least one wireless devices, data and possibly an assigned respective downlink pilot signal.

According to an aspect of embodiments herein, the object is achieved by a network node for downlink pilot signal assignment and transmission, and for data transmission. The network node has a plurality of antenna elements distributed over an area. The network node and at least one wireless device are configured to operate in a wireless communications network.

The network node is configured to determine a respective Channel State Information (CSI), and/or a respective channel hardening degree for the at least one wireless device based on an uplink pilot signal received from the at least one wireless device.

The network node may be configured to determine a respective mobility condition for the at least one wireless device.

The network node is configured to obtain a respective pilot utility metric for the at least one wireless device based on one or more out of: the determined respective CSI, the determined respective channel hardening degree and the determined respective mobility condition.

The network node is configured to assign a respective downlink pilot signal to at least one wireless device out of the at least one wireless devices having a respective pilot utility metric exceeding a predetermined threshold value.

Further, the network node is configured to transmit, to the at least one wireless device out of the at least one wireless devices, data and possibly an assigned respective downlink pilot signal.

According to an aspect of embodiments herein, the object is achieved by a method performed by a wireless device for receiving and demodulating data. The wireless device and a network node are operating in a wireless communications network, wherein the network node has a plurality of antenna elements distributed over an area.

The wireless device receives an assignment of a downlink pilot indicating whether or not a respective downlink pilot signal is assigned to the wireless device.

Further, the wireless device receives, from the network node, data and possibly an assigned downlink pilot signal.

When an assigned downlink pilot signal is received, the wireless device estimates a downlink channel based on the received downlink pilot signal and demodulates the received data using the estimated downlink channel.

In absence of a received assigned downlink pilot signal, the wireless device estimates a downlink channel as a constant and demodulates the received data using the constant as the estimate of the downlink channel.

According to an aspect of embodiments herein, the object is achieved by a wireless device for receiving and demodulating data. The wireless device and a network node are operating in a wireless communications network, wherein the network node has a plurality of antenna elements distributed over an area.

The wireless device is configured to receive an assignment of a downlink pilot indicating whether or not a respective downlink pilot signal is assigned to the wireless device.

Further, the wireless device is configured to receive, from the network node, data and possibly an assigned downlink pilot signal.

Furthermore, the wireless device is configured to estimate a downlink channel based on the received downlink pilot signal and to demodulate the received data using the estimated downlink channel, when an assigned downlink pilot signal is received.

Yet further, the wireless device is configured to estimate a downlink channel as a constant and to demodulate the received data using the constant as the estimate of the downlink channel, in absence of a received assigned downlink pilot signal.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a carrier comprising the computer program, wherein the carrier is one of an electronic signal, an optical signal, a radio signal or a computer readable storage medium.

Since the network node determines a respective pilot utility metric for the at least one wireless device and assigns a respective downlink pilot signal to at least one wireless device having a respective pilot utility metric above a threshold value, the downlink pilot signals are not assigned to all wireless devices but only assigned to wireless devices for which the downlink pilots are most useful. This may also be expressed as the downlink pilot signals are only assigned to those wireless devices having most benefits of receiving the downlink pilots. This results in an improved performance in the wireless communications network.

Some advantages with some embodiments disclosed herein are that they provide several benefits compared to state-of-the-art solutions. For example, embodiments herein provide one or more out of:

Higher downlink per-user rate: each wireless device experiences a higher effective Signal to Interference plus Noise Ratio (SINR) when active, thanks to more accurate downlink CSI. This also leads to an increased downlink sum-rate.

Reduced signaling, e.g. reduced pilot signaling, overhead, resulting in a higher downlink net per-user throughput, since the downlink pilots are assigned only to a subset of active wireless devices, i.e. only the ones that need them. This also leads to an increased DL net sum-throughput, and improves system scalability.

Better support of high-mobility wireless devices, compared to solutions where the wireless devices rely on statistical CSI obtained based on uplink pilots.

No pilot contamination in the downlink: since the number of downlink pilots to be transmitted is smaller, adopting orthogonal downlink pilots becomes easier.

Supporting for shorter coherent intervals: embodiments disclosed herein require less time-frequency resources for the downlink pilots compared to prior art.

BRIEF DESCRIPTION OF DRAWINGS

Examples of embodiments herein will be described in more detail with reference to attached drawings in which:

FIGS. 20 to 23 are flowcharts illustrating methods implemented in a communication system including a host computer, a base station and a user equipment.

DETAILED DESCRIPTION

Adopting orthogonal downlink pilots with no pilot re-use eliminates the interference caused by the pilot contamination and leads to many other advantages.

Firstly, it makes interference, such as interference from DL signals directed towards different UEs, possible to identify and report. If a UE experience a lot of DL interference it may try to correlate with the different candidate pilot sequences and identify which transmission that is causing the interference. By having the interfered UE reporting the "interfering pilot index" to the serving base station it is possible for the base station to identify the problem and solve it, e.g. by using more robust link adaptation when both UEs are active or by separating the UEs in time or frequency.

Secondly, it enables a simpler overall implementation of the system. Even if it is unlikely in a scenario with random drops, it may happen that two UEs have spatially very correlated channels. In case of orthogonal pilots nothing needs to be done about this since both UEs can estimate their own channel without any pilot contamination and both UEs can discover that the other UE might cause a lot of interference. Orthogonal pilots lead to a simple implementation since no special measures need to be taken to handle the case when there is DL pilot contamination. Handling of the potential error cases associated with pilot re-use (or non-orthogonal pilots) increases the complexity in the base station.

Thirdly, it simplifies the handover process. Orthogonal pilots with no pilot re-use are more "UE specific" while non-orthogonal pilots are more "cell specific". With UE specific pilots it is not necessary to re-configure the DL pilot when a UE moves from one cell to another. The UE can keep the same pilot in the target cell if it is available there. This is advantageous because the control message that re-defines the DL pilot can be transmitted later, when the UE is closer to the new cell and have a better channel with smaller path loss, i.e., the pilot re-configuration command does not have to be transmitted on the cell-edge, where it is most costly and difficult to do so.

For the reasons listed above, embodiments disclosed herein relate to schemes using orthogonal DL pilots with no pilot re-use. Therefore, if the number of active wireless devices, e.g. UEs, exceeds the number of samples that may be afforded for orthogonal uplink and/or downlink pilots, then the UEs in excess will not be served in the current frame. They will be scheduled in the next frame.

The term "pilot" when used in this disclosure is used to refer to a "pilot signal", a "pilot sequence" or "a reference signal", and it should be understood that the terms pilot, pilot signal, pilot sequence and reference signal may be used interchangeably.

Figure 4:
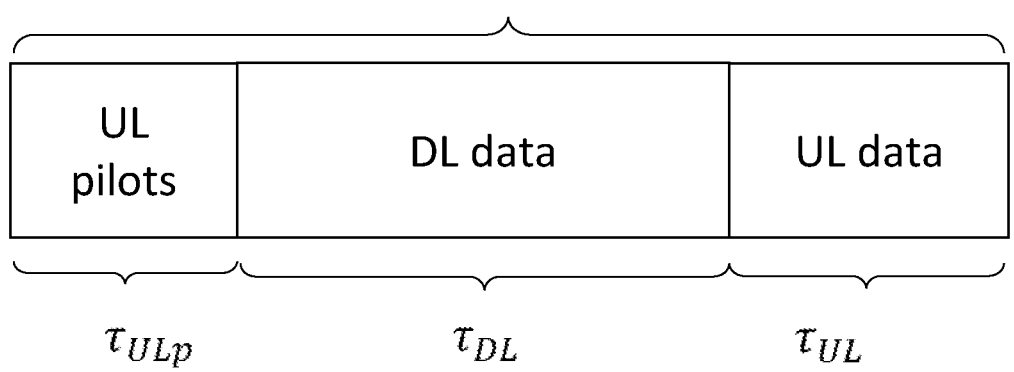
FIG. 4 schematically illustrates an example of a frame structure without a DL training phase.
Figure 5:
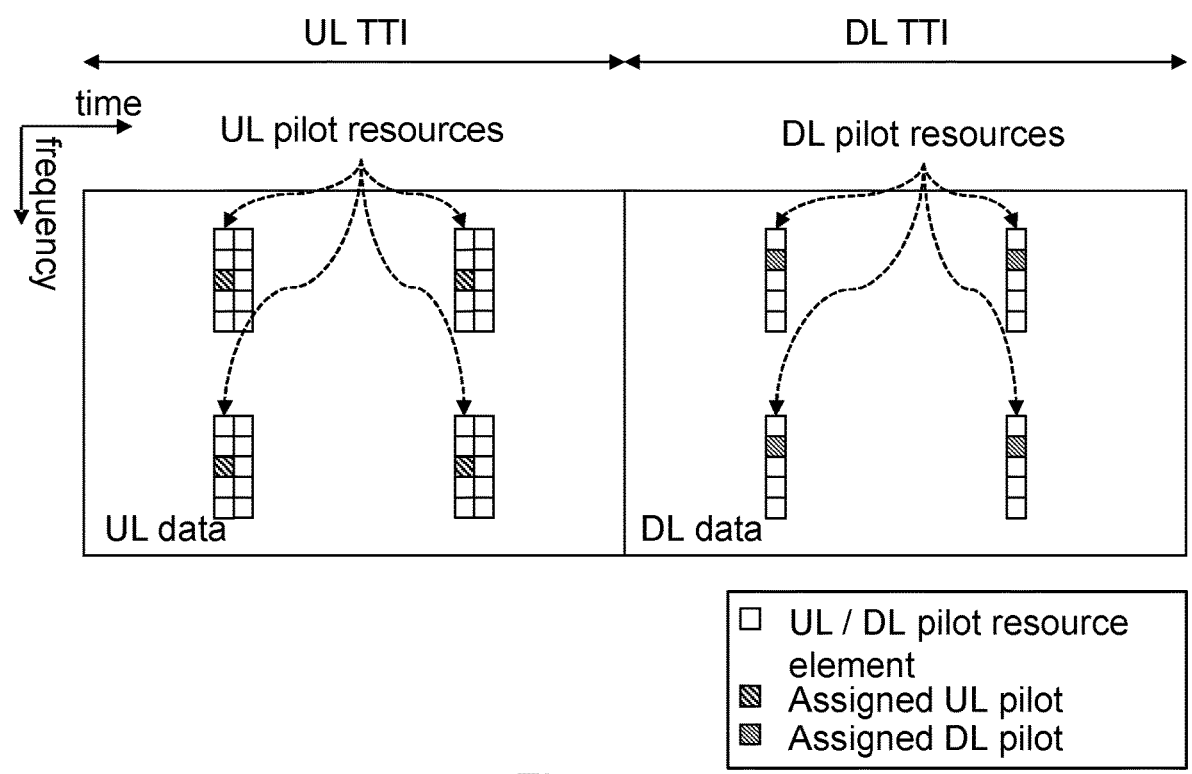
FIG. 5 schematically illustrates an example of interleaved pilot and data transmissions in the time-frequency domain.

An alternative solution is simply to not perform downlink training at all and have the terminals, e.g. the UEs, rely on statistical CSI in the decoding of the downlink data, cf. FIG. 4. Although this approach reduces the pilot signaling overhead, it is not efficient in D-maMIMO due to the lower degree of channel hardening. Indeed, this leads to a decreased downlink net per-user throughput and/or downlink net sum throughput. In addition, such an alternative solution may not even be practical for UEs with high mobility.

An object of embodiments herein is therefore to improve the performance of a wireless communications network such as a wireless communications network comprising D-maMIMO.

Embodiments herein may refer to orthogonal downlink pilot assignment in a wireless communications network, e.g. a wireless communications network comprising D-maMIMO. Further, embodiments herein relate to possible downlink pilot transmission and to data transmission.

Embodiments disclosed herein propose a strategy for orthogonal downlink pilot assignment that uses knowledge of the CSI, the channel hardening degree at each UE, and the mobility conditions for the UEs. More specifically, orthogonal downlink pilots are not assigned to all active UEs in the communications network. A network node such as the D-maMIMO BS, decides which UEs that are assigned an orthogonal downlink pilot based on the computation of a pilot utility metric. UEs having a pilot utility metric exceeding a predetermined threshold value are assigned with an orthogonal downlink pilot. The pilot utility metric is a function that considers the UE mobility, the channel hardening degree, and the CSI at each UE. The pilot utility metric guarantees an orthogonal downlink pilot to:
- UEs with high mobility, which necessarily need to know the instantaneous CSI due to significant CSI aging. By the expression "high mobility" when used herein is meant that the channel coherence time is short in comparison to the transmission time of the channel. By the expression "significant CSI aging" when used herein is meant that the CSI accuracy is significantly lower at the end of the transmission time than at the beginning.
- UEs with low or moderate mobility, but which experience a low degree of channel hardening, and therefore require instantaneous CSI to perform decoding. By the expression "low or moderate mobility" when used herein is meant that the channel coherence time is large in comparison to the transmission time. Further, by the expression "low degree of channel hardening" when used herein is meant that the channel hardening coefficient is below a threshold, e.g. lower than a threshold value.

On the other hand, all low mobility user or moderate-mobility users for whom the channel hardens sufficiently will not require downlink training, and they may rely only on statistical CSI to decode the data.

UEs may be assigned with an orthogonal downlink pilot if the Doppler is above a pre-determined threshold i.e. their CSI ages so fast that uplink pilots do not provide sufficient downlink channel knowledge, and/or the channel hardening coefficient is below a pre-determined threshold value i.e. their channel is dominated by a very small number of strong channel coefficients.

Alternatively, the network node, e.g. the BS, may decide to assign the downlink pilots to those UEs that would increase their rates, e.g. throughputs, the most by taking advantage of the downlink pilot. In this case, the pilot utility metric may be defined as a function of the achievable rates, e.g. throughputs, estimated by using the CSI knowledge at each AP.

Thus embodiments herein disclose a strategy for orthogonal downlink pilot assignment based on the UE pilot utility metric. The orthogonal downlink pilots are assigned only to the UE having a pilot utility metric exceeding a predetermined threshold value. The pilot utility metric is a function of the channel hardening degree, the UE mobility, and the CSI at each UE. It could be defined in different ways according to final purpose, e.g., absolute rate increase, relative rate increase, low-rate prioritization, etc. In general, the pilot utility metric guarantees an orthogonal downlink pilot to:
- UEs with high mobility, to cope with the CSI aging,
- UEs with low or moderate mobility experiencing low channel hardening, for which the reliance on statistical CSI in the decoding yields poor performance,
- UEs that would considerably increase their rates/throughputs by benefiting of the DL pilots.
- UEs with low or moderate-mobility and a sufficient degree of channel hardening do not need downlink pilots, thus they use only the statistical CSI to decode the received signals.

Embodiments disclosed herein provide one or more out of:
- Higher downlink per-user and sum throughput, i.e. higher downlink per user throughput and higher downlink sum throughput as compared to prior art wherein all active UEs are provided with downlink pilots.
- Lower pilot overhead, and pilot-related control signaling. In other words, the overhead in the communications network due to pilot signaling is lower as compared to prior art as is the pilot related control signaling.
- Support for high mobility users
- Improved scalability of the system
- No pilot contamination interference, simplifying the handle of potential errors caused by pilot re-use, resulting in a reduced complexity in the D-maMIMO BS
- Support for shorter coherent interval
- Easier identification of interference sources
- Simplified handover, by easing the pilot reconfiguration process A principle of "radio stripes" may be introduced as a cost-efficient implementation of D-maMIMO base stations. A distributed massive MIMO base station may be proposed wherein the antenna elements and the associated antenna processing hardware are serially located inside the same cable that also provides RF-control, data transfer and power supply. Much of the signal processing is performed independently at each antenna element, e.g. by using conjugate beamforming precoding also known as maximum ratio transmission. This reduces the backhaul requirements since only the information regarding payload data, and power control strategy, is exchanged between the APs and the central unit.

UEs that are assigned with an orthogonal downlink pilot will benefit from the improved channel knowledge provided by the orthogonal downlink pilot, resulting in reduced channel estimation error, and increased SINR after channel equalization.

UEs that are not assigned with an orthogonal downlink pilot (for which the reliance on statistical CSI in the decoding yields good performance) may instead use the downlink pilot resources to transmit data and will benefit from lower overhead resulting in increased data rate.

Figure 6:
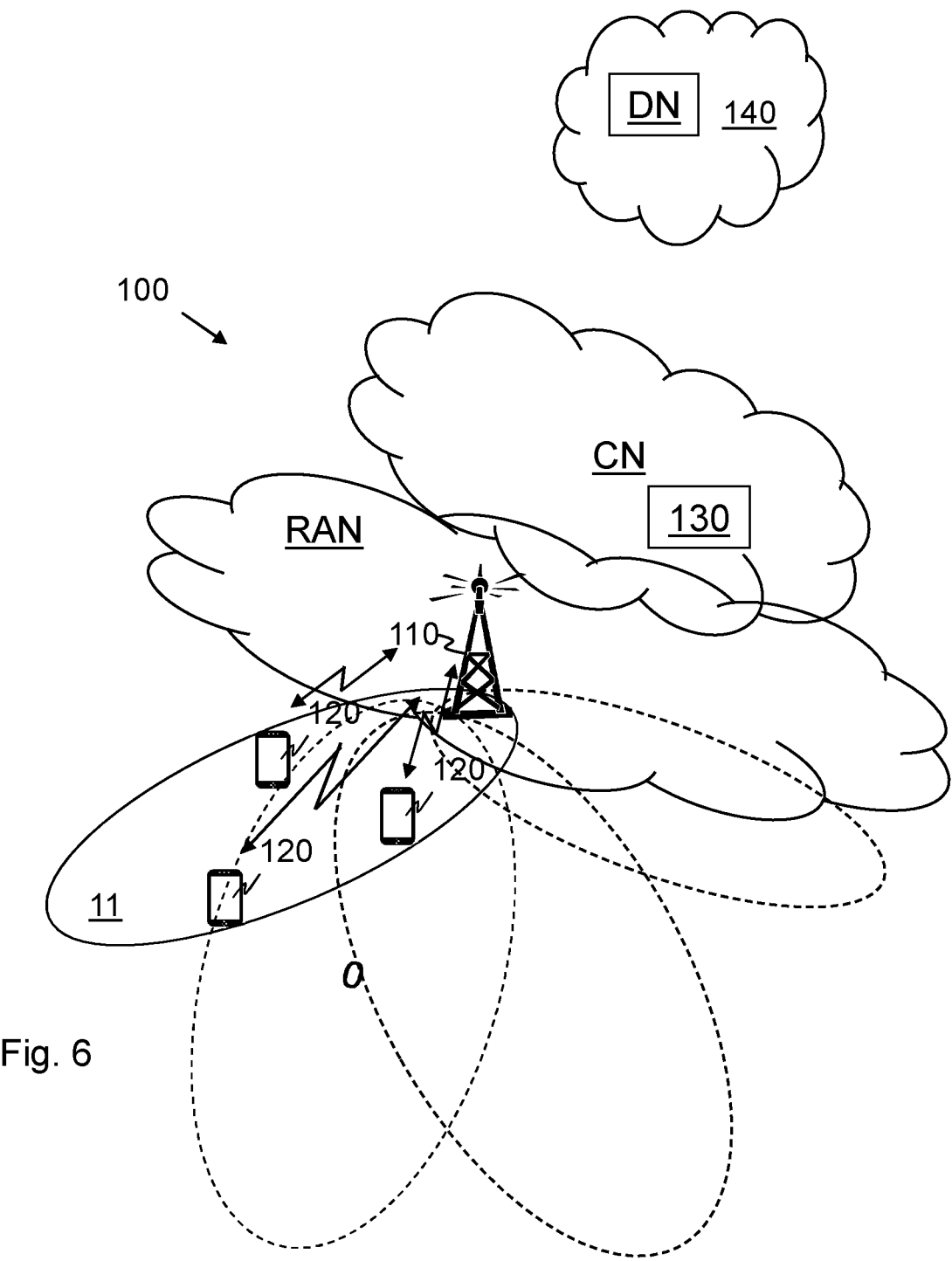
FIG. 6 schematically illustrates embodiments of a wireless communications network.

Embodiments herein relate to wireless communication networks in general. FIG. 6 is a schematic overview depicting a wireless communications network 100. The wireless communications network 100 is a D-maMIMO communications network comprising one or more RANs and one or more CNs. The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

At least one wireless device 120, sometimes herein also referred to as a UE or terminal, is operates in the wireless communications network 100.

The wireless device 120 may be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

One or more network nodes operate in the radio communications network 100, such as a network node 110 also referred to as a base station, providing radio coverage over a geographical area, a service area 11, which may also be referred to as a beam or a beam group of a first radio access technology (RAT), such as NR, 5G, LTE, Wi-Fi, NB-IoT, CAT-M, Wi-Fi, eMTC or similar. The network node 110 is a network node having a plurality of antenna elements distributed over an area. The antenna elements are cooperating with each other in the same time-frequency resources. Such a network node may be referred to as a D-maMIMO network node. The number of antenna elements may be in the range of tens to several hundred or more, and the area may correspond to the service area 11, just to give some examples. The antenna elements of the network node 110 are sometimes in this disclosure referred to as Access Points (APs). Each AP may comprise one or more antenna elements. As previously mentioned, the APs, i.e. the antenna elements, are connected to a Central Processing Unit (CPU) through high-capacity backhaul links, e.g. fiber optic cables. The CPU may be comprised in or connected to the network node 110.

The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the radio access technology and terminology used. The network node 110 may be referred to as a serving radio network node and communicates with the wireless device 120 with Downlink (DL) transmissions to the wireless device 120 and Uplink (UL) transmissions from the wireless device 120. As mentioned above, the network node 110 may be a D-maMIMO network node.

Further network nodes operate in the radio communications network 100, such as a network node 130 also referred to as a core network node 130. The network node 130 may be an MME which is a control node for an LTE access network, a Serving Gateway (SGW), and a Packet Data Network Gateway (PGW). An MME is amongst other responsible for tracking and paging procedure including retransmissions.

Figure 15:
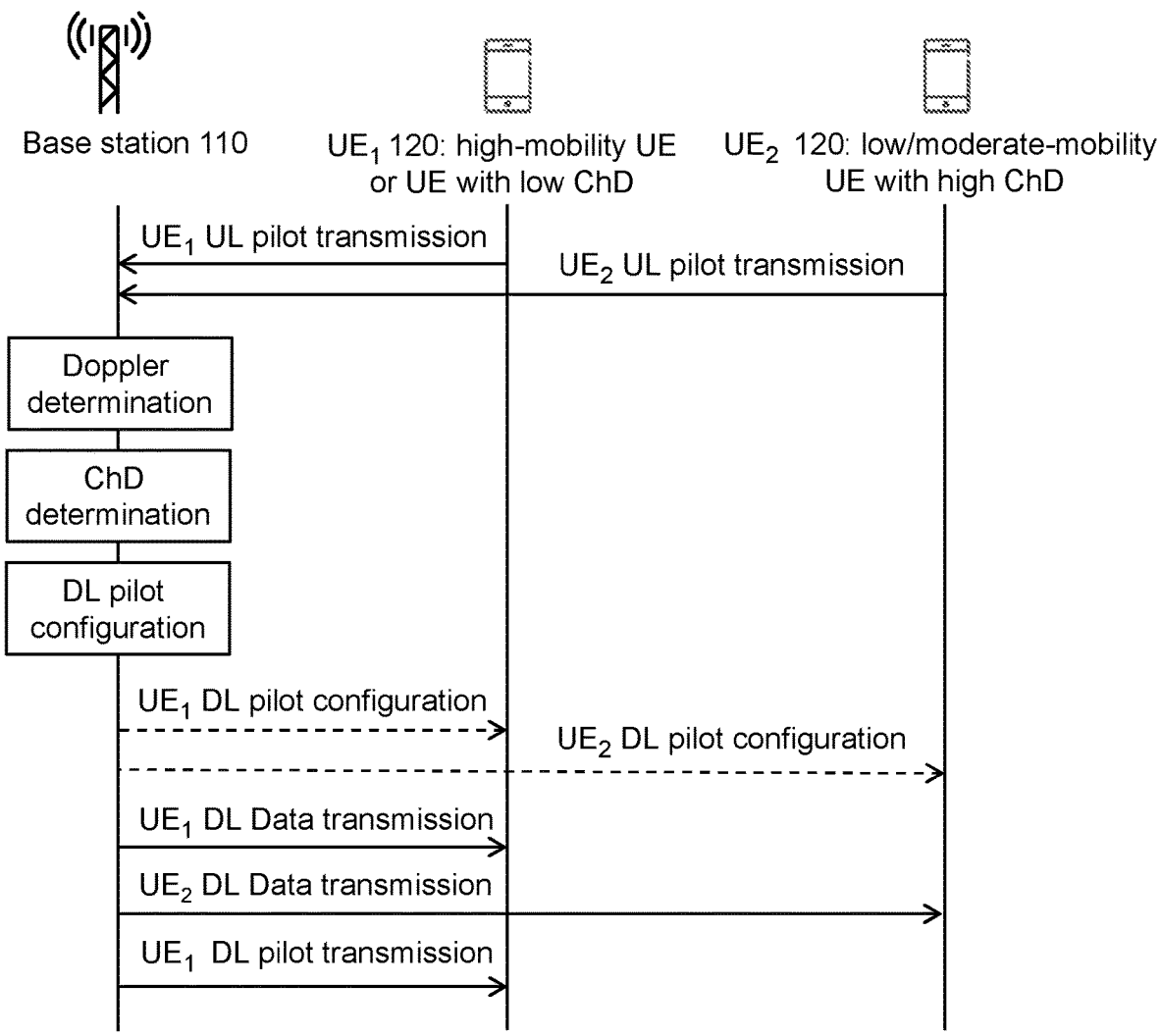
FIG. 15 is a schematic combined flow chart and signalling scheme of embodiments of a wireless communications network.

Methods e.g. for downlink pilot assignment and transmission in the wireless communications network 110, is performed by the network node 110. As an alternative, a Distributed Node (DN) and functionality, e.g. comprised in a cloud 140 as shown in FIG. 15 may be used for performing or partly performing the methods.

Actions of Some Embodiments Herein

Figure 7A:
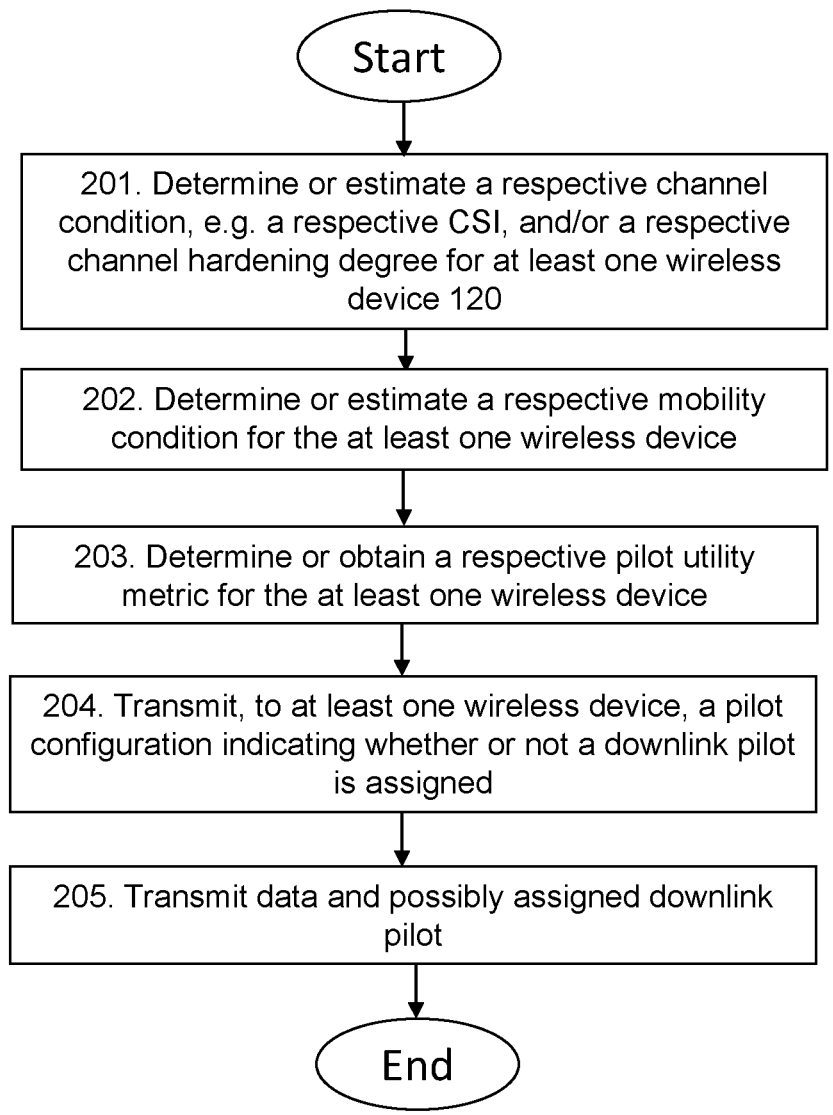
FIG. 7A is a flowchart depicting embodiments of a method performed by a network node.

Example embodiments of a flowchart depicting embodiments of a method performed by the network node 110, e.g. for downlink pilot assignment and transmission is depicted in FIG. 7A and will be described more in detail in the following. The network node 110 has, e.g. comprises, a plurality of antenna elements distributed over an area, wherein the network node 110 and at least one wireless device 120 are operating in a wireless communications network 100. As previously mentioned, the network node 110 has a plurality of antenna elements distributed over an area. The network node 110 may be equipped with the plurality of antenna elements or the network node may be connected to the plurality of antenna elements. Further, the network node 110 utilises the plurality of antenna elements for communication over the radio interface with one or more wireless devices, e.g. the wireless device 120. The antenna elements may cooperate with each other in the same time-domain frequency resources. In some embodiments, the network node 110 is a D-maMIMO network node such as a D-maMIMO BS. The method may comprise one or more of the following actions which actions may be taken in any suitable order. Further, it should be understood that one or more actions may be combined.

In action 201, the network node 110 determines or estimates a respective channel condition, e.g. a respective Channel State Information (CSI), and/or a respective channel hardening degree for the at least one wireless device 120. As previously described, the network node 110 performs the determination or estimation based on an uplink pilot signal received from the at least one wireless device 120.

By the term "CSI" when used in this disclosure is meant Channel State Information, i.e. knowledge related to some property of the radio channel.

In action 202, the network node 110 determines or estimates a respective mobility condition for the at least one wireless device 120. As will be described below, this action may be optional.

In action 203, the network node 110 determines or obtains a respective pilot utility metric for the at least one wireless device 120, based on one or more out of: the determined/estimated respective channel condition i.e. the respective CSI, the determined/estimated respective channel hardening degree and the determined/estimated respective mobility condition. Thus, based on one or more out of the respective CSI, the respective channel hardening degree or the respective mobility condition, the network node 110 may determine a respective utility metric for the at least one wireless device 120. The pilot utility metric gives an indication, e.g. a measure, of how useful a downlink pilot would be for the wireless device. Thus, the pilot utility metric is an indication of a downlink pilot's usefulness for the at least one wireless device 120. Therefore, the respective wireless device's pilot utility metric may be used to determine a subset of wireless devices out of a set of wireless devices, which subset comprises the wireless device having a pilot utility metric indicating that the downlink pilot signal would be most useful for them. Thus, wireless devices having a pilot utility metric above a predetermined threshold value may be grouped in the subset. The predetermined threshold value may be the highest utility metric of the wireless devices not belonging to the subset.

Further, the pilot utility metric may be determined or obtained based on a priority for the wireless device, which priority indicates whether or not the wireless device is to be prioritised when assigning a respective downlink pilot to the at least one wireless device.

As will be described below, the pilot utility metric may be determined or obtained in several ways.

In some embodiments, the network node 110 obtains the respective pilot utility metric for the at least one wireless device 120 by obtaining the pilot utility metric as $$pu_k = wD_k + (1-w)(1-ChD_k),$$

wherein $D_k \in [0,1]$ is a Doppler spread value, $w \in [0,1]$ is a weight to prioritize differently between the user mobility and the channel hardening degree (ChD), and k indicates which one out of the k wireless devices operating in the wireless communications network 100 for which the pilot utility metric $pu_k$ is valid. The Doppler spread value is a measure that is inversely proportional to how long the channel knowledge (i.e the CSI) may be considered to be valid.

Alternatively, in some embodiments, the network node 110 obtains the respective pilot utility metric for the at least one wireless device 120 by obtaining the pilot utility metric based on a priority for the wireless device. The priority indicates whether or not the wireless device is to be prioritised when assigning a respective downlink pilot signal to the at least one wireless device 120. In such embodiments, the network node 110 may obtain the respective pilot utility metric for the at least one wireless device 120 by obtaining the pilot utility metric as:

$$pu_k = wD_k + (1-w)(1-ChD_k) + \alpha_k, \text{ or}$$

$$pu_k = \alpha_k(wD_k + (1-w)(1-ChD_k)),$$

wherein $D_k \in [0,1]$ is a Doppler spread value, $w \in [0,1]$ is a weight, e.g. a scaling factor, to prioritize differently between the user mobility and the Channel hardening Degree (ChD), $\alpha_k \in [0,1]$ is a priority for the wireless device, and k indicates which one out of the k wireless devices operating in the wireless communications network 100 for which the pilot utility metric $pu_k$ is valid.

Alternatively, in some embodiments, the network node 110 obtains the respective pilot utility metric for the at least one wireless device 120 by obtaining the pilot utility metric as one out of:

$$pu_k = \alpha_k(wD_k + (1-w)(R_k^{DLp} - R_k^{ULp})),$$

$$pu_k = \alpha_k(wD_k + (1-w)(T_k^{DLp} - T_k^{ULp})),$$

$$pu_k = \alpha_k(wD_k + (1-w)(\{R_k^{DLp} - R_k^{ULp}\}/R_k^{DLp})),$$

$$pu_k = \alpha_k(wD_k + (1-w)(\{T_k^{DLp} - T_k^{ULp}\}/T_k^{DLp})),$$

$$pu_k = \alpha_k(wD_k + ((1-w)/R_k^{ULp})),$$

wherein $D_k \in [0,1]$ is a Doppler spread value, $w \in [0,1]$ is a weight, e.g. a scaling factor, giving a relative importance of a user based mobility component and a channel state dependent component, $R_k^{DLp}$ is a rate the wireless device k would achieve by using the respective downlink pilot signal DLp, $R_k^{ULp}$ is a rate the wireless device would achieve when the network node 110 only relies on CSI estimated from an uplink pilot signal ULp received from the wireless device, $T_k^{DLp}$ is a throughput the wireless device k would achieve by using the respective downlink pilot signal DLp, $T_k^{ULp}$ is a throughput the wireless device would achieve when the network node 110 only relies on CSI estimated from an uplink pilot signal ULp received from the wireless device, and k indicates which one out of the k wireless devices operating in the wireless communications network 100 for which the pilot utility metric $pu_k$ is valid.

In action 204, the network node 110 assigns a respective downlink pilot to at least one wireless device out of the at least one wireless devices 120 having a respective pilot utility metric exceeding a predetermined threshold value or transmits, to each wireless device out of the at least one wireless device 120 a respective pilot configuration indicating whether or not a respective downlink pilot is assigned, wherein at least one wireless device out of the at least one wireless devices 120 having a respective pilot utility metric exceeding a predetermined threshold value is assigned a respective downlink pilot. The pilot configuration may also indicate an index identifying the pilot. The downlink pilots assigned to different wireless devices are orthogonal downlink pilots. Thus, the respective downlink pilots are respective orthogonal downlink pilots. By orthogonal downlink pilots is meant that the cross-correlation between any pair of downlink pilots is zero.

In some embodiments and based on the obtained respective pilot utility metric for the at least one wireless device 120, the network node 110 groups each one of the at least one wireless devices 120 in a first group of wireless devices which are to be assigned a respective downlink pilot signal or in a second group of wireless devices which are not requiring a respective downlink pilot signal. The wireless devices of the first group of wireless devices may have a respective pilot utility metric exceeding a predetermined threshold value. As will be described below, by such a grouping the network node 110 groups the wireless devices into two categories: (i) wireless devices requiring downlink pilots, and (ii) wireless devices not requiring downlink pilots. For example, if the communications network comprises 50 active wireless devices 120 and if only 25 downlink pilots are available, the network node 110 may be configured to group the 25 wireless devices having the 25 highest pilot utility metric in the first group of wireless devices requiring a downlink pilot, and the other 25 wireless devices in the second group of wireless devices not requiring a downlink pilot. This may also be expressed as the 25 wireless devices having a pilot utility metric higher than a predetermined threshold value should be assigned a downlink pilot, wherein the predetermined threshold value is the pilot utility metric of the 26$^{th}$ wireless device in this example.

In action 205, the network node 110 transmits to the at least one wireless device out of the at least one wireless device 120, data and possibly an assigned respective downlink pilot using the configured pilot configuration. Thus, if the wireless device in action 204 is assigned a downlink pilot, in action 205 the assigned downlink pilot is transmitted to the wireless device. If the network node 110 in action 204 has transmitted the pilot configuration to the wireless device, the downlink pilot is transmitted to the wireless device using that pilot configuration. However, it should be understood that the downlink pilot may be transmitted in accordance with another configuration as long as the configuration used is known to the wireless device. Consequently, in some embodiments the wireless device may be configured, e.g. pre-configured, with the pilot configuration and no transmission of the configured pilot configuration is needed.

Figure 7B:
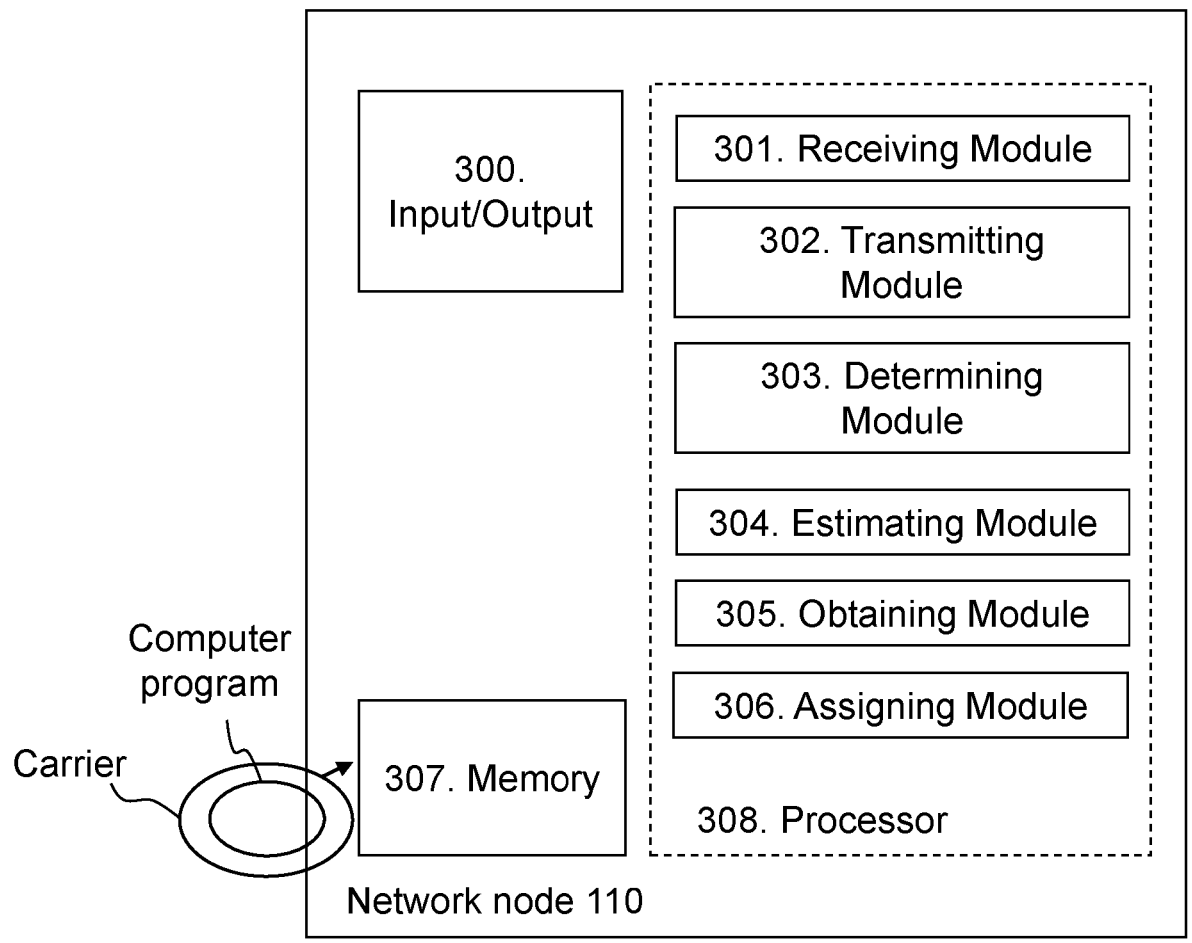
FIG. 7B is a schematic block diagram illustrating embodiments of a network node.

To perform the method actions e.g. for downlink pilot assignment and transmission, the network node 110 may comprise the arrangement depicted in FIG. 7B. As previously mentioned, the network node 110 is configured to have a plurality of antenna elements distributed over an area. The network node 110 may be configured to be equipped with the plurality of antenna elements or the network node may be configured to be connected to the plurality of antenna elements. Further, the network node 110 is configured to utilise the plurality of antenna elements for communication over the radio interface with one or more wireless devices, e.g. the wireless device 120. The antenna elements may cooperate with each other in the same time-domain frequency resources. In some embodiments, the network node 110 is a D-maMIMO network node such as a D-maMIMO BS.

The network node 110 may comprise an input and output interface 300 configured to communicate with the wireless device 120. The input and output interface may comprise a wireless receiver (not shown) and a wireless transmitter (not shown).

The network node 110 may be configured to receive, e.g. by means of a receiving module 301 configured to receive a transmission such a signal or data. The receiving module 301 may be implemented by or arranged in communication with a processor 308 of the network node 110. The processor 308 will be described in more detail below. The receiving module 301 may also be referred to as a receiving unit.

Further the network node 110 may be configured to transmit, e.g. by means of a transmitting module 302 configured to transmit a transmission such a signal or data. The transmitting module 302 may be implemented by or arranged in communication with the processor 308. The transmitting module 302 may also be referred to as a transmitting unit.

The network node 110 is configured to transmit, to the at least one wireless device out of the at least one wireless device 120, data and possibly an assigned respective downlink pilot signal.

The network node 110 may e.g. comprise a determining module 303, an estimating module 304, an obtaining module 305 and an assigning module 306.

The network node 110 may be configured to determine or estimate, e.g. by means of the determining module 303 or the estimating module 304, a respective CSI and/or a respective channel hardening degree for the at least one wireless device 120 based on an uplink pilot signal received from the at least one wireless device 120.

The network node 110 may further be configured to determine a respective mobility condition for the at least one wireless device.

The determining module 303 and the estimating module 304 may be implemented by or arranged in communication with the processor 308. The determining module 303 and the estimating unit 304 may also be referred to as a determining unit and an estimating unit, respectively.

The network node 110 may be configured to determine or obtain, e.g. by means of the determining module 303 or the obtaining module 305, a respective pilot utility metric for the at least one wireless device 120 based on one or more out of: the determined respective CSI, the determined respective channel hardening degree and the determined respective mobility condition.

The obtaining module 305 may be implemented by or arranged in communication with the processor 308. The obtaining module 305 may also be referred to as an obtaining unit.

The network node 110 may be configured to, based on the obtained respective pilot utility metric for the at least one wireless device 120, group each one of the at least one wireless devices 120 in a first group of wireless devices which are to be assigned a respective downlink pilot signal or in a second group of wireless devices which are not requiring a respective downlink pilot signal. The wireless devices of the first group of wireless devices may have a respective pilot utility metric exceeding a predetermined threshold value.

In some embodiments, the network node 110 is configured to obtain the respective pilot utility metric for the at least one wireless device 120, by further being configured to obtain the pilot utility metric as $pu_k = wD_k + (1-w)(1-ChD_k)$, wherein $D_k \in [0,1]$ is a Doppler spread value, $w \in [0,1]$ is a weight to prioritize differently between the user mobility and the channel hardening degree, ChD, and k indicates which one out of the k wireless devices operating in the wireless communications network 100 for which the pilot utility metric $pu_k$ is valid.

In some embodiments, the network node 110 is configured to obtain the respective pilot utility metric for the at least one wireless device 120, by further being configured to obtain the pilot utility metric based on a priority for the wireless device, which priority indicates whether or not the wireless device is to be prioritised when assigning a respective downlink pilot signal to the at least one wireless device 120.

In some embodiments, the network node 110 is configured to obtain the respective pilot utility metric for the at least one wireless device 120, by further being configured to obtain the pilot utility metric as:

$$pu_k = wD_k + (1-w)(1-ChD_k) + \alpha_k, \text{ or}$$

$$pu_k = \alpha_k((wD_k + (1-w)(1-ChD_k)),$$

wherein $D_k \in [0,1]$ is a Doppler spread value, $w \in [0,1]$ is a weight to prioritize differently between the user mobility and the Channel hardening Degree, ChD, $\alpha_k \in [0,1]$ is a priority for the wireless device, and k indicates which one out of the k wireless devices operating in the wireless communications network 100 for which the pilot utility metric $pu_k$ is valid.

Alternatively, the network node 110 may be configured to obtain the respective pilot utility metric for the at least one wireless device 120, by further being configured to obtain the pilot utility metric as one out of:

$$pu_k = \alpha_k(wD_k + (1-w)(R_k^{DLp} - R_k^{ULp})),$$

$$pu_k = \alpha_k(wD_k + (1-w)(T_k^{DLp} - T_k^{ULp})),$$

$$pu_k = \alpha_k(wD_k + (1-w)(\{R_k^{DLp} - R_k^{ULp}\}/R_k^{DLp})),$$

$$pu_k = \alpha_k(wD_k + (1-w)(\{T_k^{DLp} - T_k^{ULp}\}/T_k^{DLp})),$$

$$pu_k = \alpha_k(wD_k + ((1-w)/R_k^{ULp})),$$

wherein $D_k \in [0,1]$ is a Doppler spread value, $w \in [0,1]$ is a weight giving a relative importance of a user based mobility component and a channel state dependent component, $R_k^{DLp}$ is a rate the wireless device k would achieve by using the respective downlink pilot signal DLp, $R_k^{ULp}$ is a rate the wireless device 120 would achieve when the network node 110 only relies on CSI estimated from an uplink pilot signal ULp received from the wireless device, $T_k^{DLp}$ is a throughput the wireless device k would achieve by using the respective downlink pilot signal DLp, $T_k^{ULp}$ is a throughput the wireless device would achieve when the network node 110 only relies on CSI estimated from an uplink pilot signal ULp received from the wireless device, and k indicates which one out of the k wireless devices operating in the wireless communications network 100 for which the pilot utility metric $pu_k$ is valid.

The network node 110 may be configured to assign, e.g. by means of the assigning module 306, a respective downlink pilot signal to at least one wireless device out of the at least one wireless device 120 having a respective pilot utility metric exceeding a predetermined threshold value.

The assigning module 306 may be implemented by or arranged in communication with the processor 308. The assigning module 306 may also be referred to as an assigning unit.

In some embodiments, the network node 110 is configured to assign the respective downlink pilot signal by further being configured to transmit, to each wireless device out of the at least one wireless device 120, a pilot configuration indicating whether or not a respective downlink pilot signal is assigned.

Those skilled in the art will also appreciate that the modules in the network node, 110, described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 308 of a processing circuitry in network node 110 depicted in FIG. 7B, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 307 comprising one or more memory units. The memory comprises instructions executable by the processor in the network node 110.

The memory is arranged to be used to store e.g. data, configurations, and applications to perform the methods herein when being executed in the network node 110.

In some embodiments, a respective computer program comprises instructions, which when executed by the respective at least one processor, cause the at least one processor of the network node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Figure 8A:
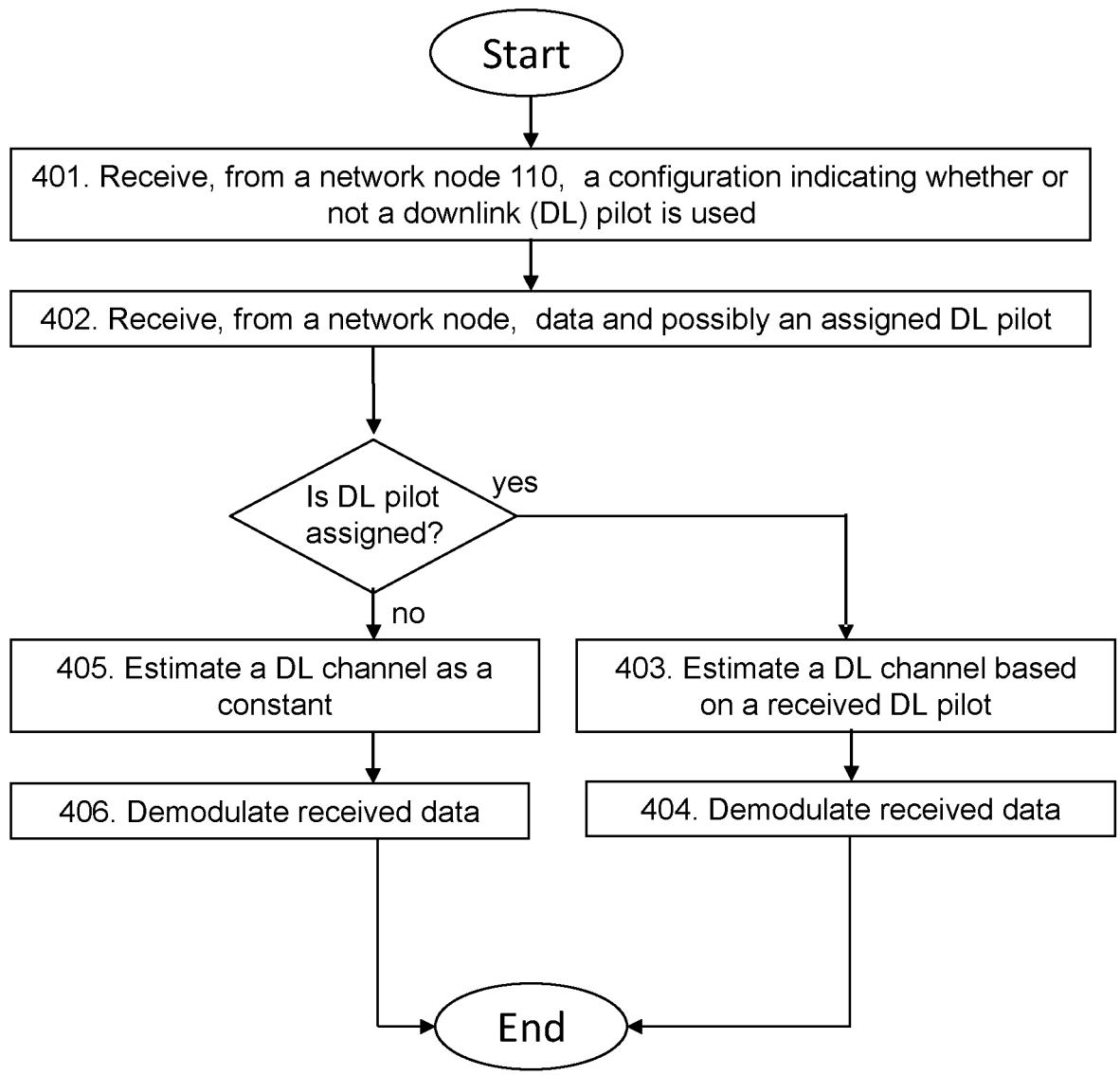
FIG. 8A is a flowchart depicting embodiments of a method performed by a wireless device.

Example embodiments of a flowchart depicting embodiments of a method performed by the wireless device 120, e.g. for receiving and demodulating data, is depicted in FIG. 8A and will be described more in detail in the following. The wireless device 120 and the network node 110 are operating in a wireless communications network 100. Further, the network node 110 comprises a plurality of antenna elements distributed over an area. As previously mentioned, the network node 110 may be equipped with the plurality of antenna elements or the network node may be connected to the plurality of antenna elements. Further, the network node 110 utilises the plurality of antenna elements for communication over the radio interface with one or more wireless devices, e.g. the wireless device 120. The antenna elements may cooperate with each other in the same time-domain frequency resources. In some embodiments, the network node 110 is a D-maMIMO network node such as a D-maMIMO BS. The method may comprise one or more of the following actions which actions may be taken in any suitable order. Further, it should be understood that one or more actions may be combined.

In action 401, the wireless device 120 receives, from the network node 110, an assignment of a downlink pilot, e.g. the wireless device 120 receives a pilot configuration indicating whether or not a DL pilot is assigned. It should be understood that this action may be optional. As previously mentioned, the network node 110 may transmit an assigned respective downlink pilot to the wireless device 120 using a pilot configuration, e.g. the received pilot configuration. However, it should be understood that the downlink pilot may be transmitted in accordance with another configuration as long as the configuration used is known to the wireless device. Consequently, in some embodiments the wireless device may be configured, e.g. pre-configured, with the pilot configuration and no transmission of the configured pilot configuration is needed. In some embodiments, the network node 110 may transmit a single bit to the wireless device 120 in order to indicate whether or not a downlink pilot signal is assigned. For example a "0" may indicate no assignment and a "1" may indicate an assignment of a downlink pilot signal.

In action 402, the wireless device 120 receives, from the network node 110, data and possibly an assigned downlink pilot.

In action 403, when an assigned downlink pilot is received, the wireless device 120 determines or estimates a DL channel based on the received DL pilot. The DL channel referred to in this disclosure is the channel response between the network node 110 and the wireless device 120 in the downlink. The transmission media, e.g. cable, radio, fibre, etc., is also referred to as Layer 0 of the Open Systems Interconnection (OSI) Model.

In action 404, when the assigned downlink pilot is received, the wireless device 120 demodulates the received data using the estimate of the estimated DL channel. Thus, the wireless device 120 demodulates the received data using the estimated DL channel.

In action 405, in absence of a received assigned downlink pilot, the wireless device 120 determines or estimates a DL channel as a constant.

In action 406, in absence of a received assigned downlink pilot, the wireless device 120 demodulates the received data using the constant as the estimate of the DL channel.

In actions 404 and 406, the demodulation process may be the same and only the "weights" used in the demodulation process is changed.

In action 404 these weights are given by the estimation process of the DL channel sometimes referred to as instantaneous CSI. Thus, in action 404 the estimated DL channel may be an estimated instantaneous CSI of the DL channel, which instantaneous CSI is estimated by the wireless device 120 based on the received downlink pilot signal. Further, in Action 404, the wireless device 120 may demodulate the received data using the estimated instantaneous CSI.

In action 406 the weights are known a-priori at the user side sometimes referred to as Statistical CSI. Thus, in action 405, the wireless device 120 estimates the downlink channel as a constant using statistical CSI, e.g. by using long term estimates of the channel which estimates are estimated by the network node 110 based on uplink pilots. Further, in Action 406 the wireless device 120 may demodulate the received data using the statistical CSI.

Figure 8B:
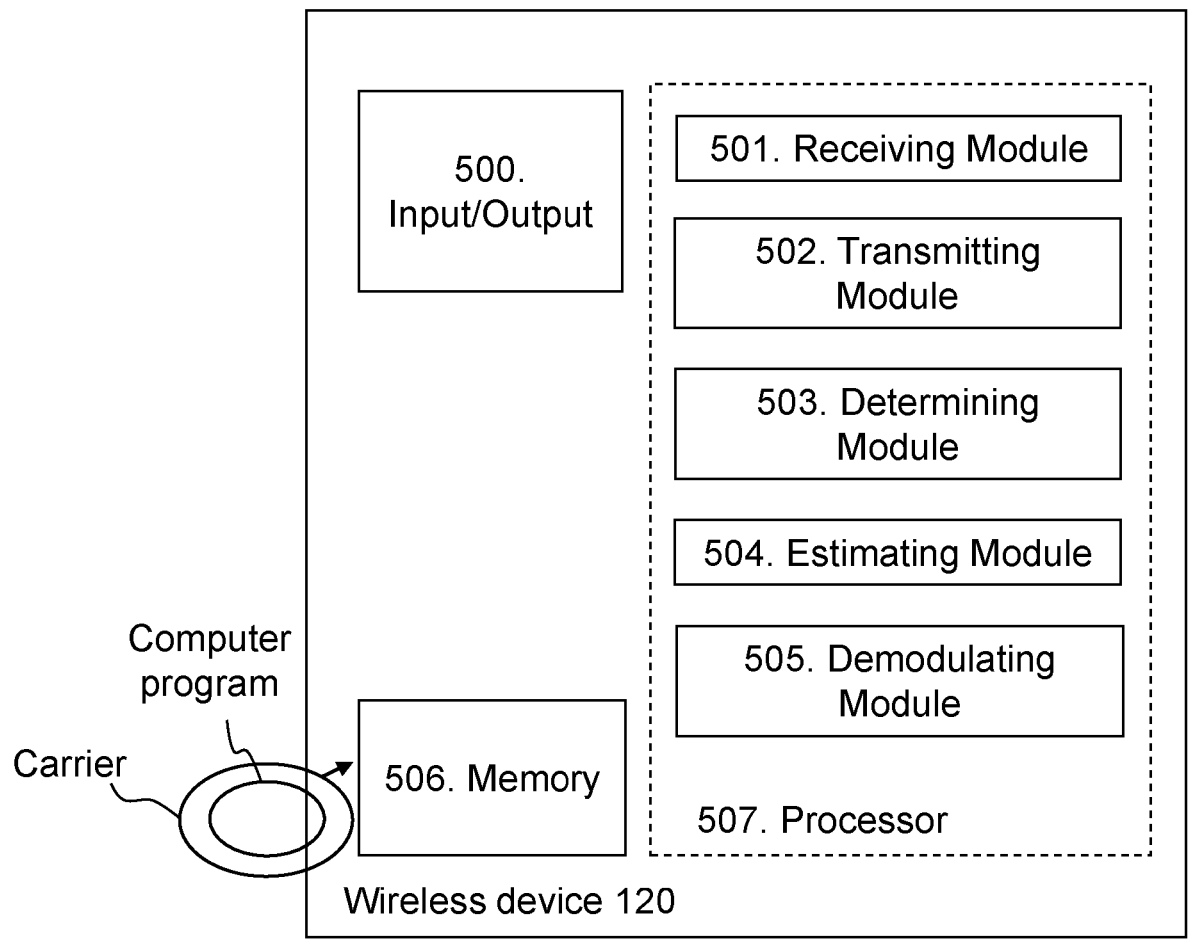
FIG. 8B is a schematic block diagram illustrating embodiments of a wireless device.

To perform the method actions e.g. for receiving and demodulating data, the wireless device 120 may comprise the arrangement depicted in FIG. 8B. As previously mentioned, the wireless device 120 and the network node 110 are operating in the wireless communications network 100. Further, the network node 110 comprises a plurality of antenna elements distributed over an area. As also previously mentioned, the network node 110 may be equipped with the plurality of antenna elements or the network node may be connected to the plurality of antenna elements. Further, the network node 110 utilises the plurality of antenna elements for communication over the radio interface with one or more wireless devices, e.g. the wireless device 120. The antenna elements may cooperate with each other in the same time-domain frequency resources. In some embodiments, the network node 110 is a D-maMIMO network node such as a D-maMIMO BS.

The wireless device 120 may comprise an input and output interface 500 configured to communicate with the network node 110. The input and output interface may comprise a wireless receiver (not shown) and a wireless transmitter (not shown).

The wireless device 120 may be configured to receive, e.g. by means of a receiving module 501 configured to receive a transmission such a signal or data. The receiving module 501 may be implemented by or arranged in communication with a processor 507 of the wireless device 120. The processor 507 will be described in more detail below. The receiving module 501 may also be referred to as a receiving unit.

The wireless device 120 is configured to receive a pilot configuration indicating whether or not a respective downlink pilot signal is assigned to the wireless device 120.

Further, the wireless device 120 is configured to receive, from the network node 110, data and possibly an assigned downlink pilot signal.

In some embodiments, the wireless device 120 is configured to receive the assignment of a downlink pilot signal by further being configured to receive a pilot configuration indicating whether or not a downlink pilot is assigned.

Further the wireless device 120 may be configured to transmit, e.g. by means of a transmitting module 502 configured to transmit a transmission such a signal or data. The transmitting module 502 may be implemented by or arranged in communication with the processor 507. The transmitting module 502 may also be referred to as a transmitting unit.

The wireless device 120 may e.g. comprise a determining module 503, an estimating module 504 and a demodulating module 505. The determining module 503, the estimating module 504 and the demodulating module 505 may be implemented by or arranged in communication with the processor 507. The determining module 503, the estimating module 504 and the demodulating module 505 may also be referred to as a determining unit, an estimating unit and a demodulating unit, respectively.

The wireless device 120 is configured to, when an assigned downlink pilot signal is received, estimate, e.g. by means of the estimating module 504, a downlink channel based on the received downlink pilot signal, and demodulate the received data using the estimated downlink channel.

In some embodiments, when an assigned downlink pilot signal is received, the wireless device 120 is configured to estimate the downlink channel by estimating instantaneous CSI of the downlink channel based on the received downlink pilot signal. In such embodiments, the wireless device 120 may be configured to demodulate the received data using the estimated instantaneous CSI.

In some embodiments, in the absence of a received assigned downlink pilot signal, the wireless device 120 is configured to estimate a downlink channel as a constant. In such embodiments, the wireless device 120 may be configured to demodulate the received data using the constant as the estimate of the downlink channel. As mentioned above, in the absence of a received assigned downlink pilot signal, the wireless device 120 is configured to estimate the downlink channel as a constant using statistical CSI, e.g. by using long term estimates of the channel which estimates are estimated by the network node 110 based on uplink pilots. Further, in such embodiments, the wireless device 120 may be configured demodulate the received data using the statistical CSI.

Those skilled in the art will also appreciate that the modules in the wireless device 120 described above may refer to a combination of analog and digital circuits, and/or one or more processors configured with software and/or firmware, e.g. stored in the wireless device 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 507 of a processing circuitry in the wireless device 120 depicted in FIG. 8B, together with respective computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 506 comprising one or more memory units. The memory comprises instructions executable by the processor in the wireless device 120.

The memory is arranged to be used to store e.g. data, configurations, and applications to perform the methods herein when being executed in the wireless device 120.

In some embodiments, a respective computer program comprises instructions, which when executed by the respective at least one processor, cause the at least one processor of the wireless device 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Performance Evaluation and Simulation Results

Let us consider a massive MIMO system where a BS equipped by M APs simultaneously serves K single-antenna equipped UEs (M>K), in the same frequency band, by operating in TDD mode. For example, the BS is the network node 110 and one or more of the K single-antenna equipped UEs are one or more wireless devices 120. The APs, e.g. the antenna elements of the network node 110, are geographically distributed in a wide area and it is assumed that they are deployed as a regular grid. In this simulation, each AP has one and only one antenna element.

The simulations aim to compare the performance, in terms of downlink net sum throughput and average downlink net per-user throughput, obtained by using a solution provided by embodiments disclosed herein and the existing solutions of the state-of-the-art. The basic parameters used in the simulations are listed in Table 1 below. Subject to the assumption that the terminals, e.g. the wireless device 120, transmit Gaussian message-bearing symbols, the instantaneous downlink capacity (achievable downlink rate) of the k-th UE within each coherence interval is equal to the logarithm of one plus the signal-to-interference ratio in the downlink (SINR$_k$). The downlink net throughput per UE, in units of bits/sec/UE, accounts for the total bandwidth and the symmetric TDD mode, and the pilot overhead (the ratio of the time spent sending data to the total slot-length):

$$T_k = \frac{B}{2}\left(\frac{\tau - \tau_p}{\tau}\right)\log_2(1 + SINR_k)$$

The DL net sum throughput, measured in bits/sec, is equal to the sum of the net throughputs per UE, $$T_{sum} = \sum_{k=1}^{K} T_k$$

TABLE 1

Basic parameters for the simulation.

| Parameter | Value |
|---|---|
| Simulation area | 1 km² |
| Coherence Interval τ | 200 symbols |
| Carrier Frequency f | 2 GHz |
| Bandwidth | 20 MHz |
| Small-scale fading model | Block Rayleigh fading with i.i.d realizations |
| Large-scale fading model | three-slope pathloss model + uncorrelated shadow fading with standard deviation 8 dB |
| AP antenna height h$_{AP}$ | 5 m |
| UE antenna height h$_u$ | 1.65 m |
| Radiated power per antenna element | 200 mW DL, 100 mW UL. |

Figure 9:
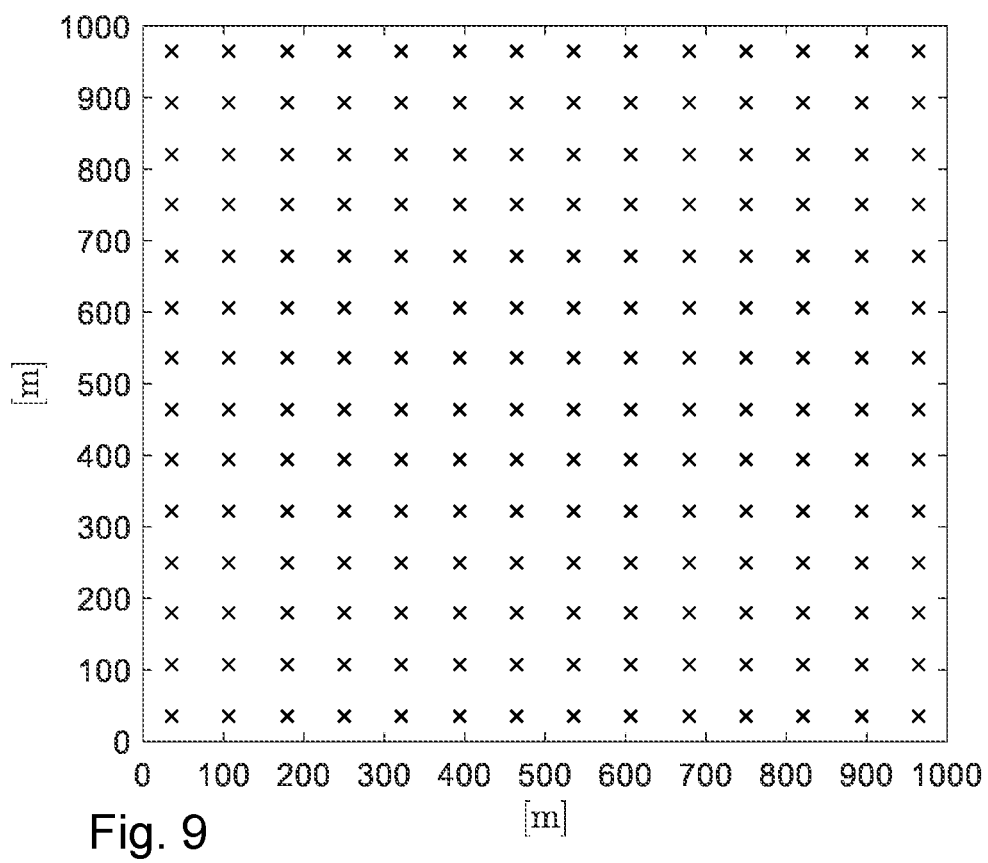
FIG. 9 schematically illustrates an example of a grid deployment comprising 14×14 APs in an area of 1 km2.
Figure 10:
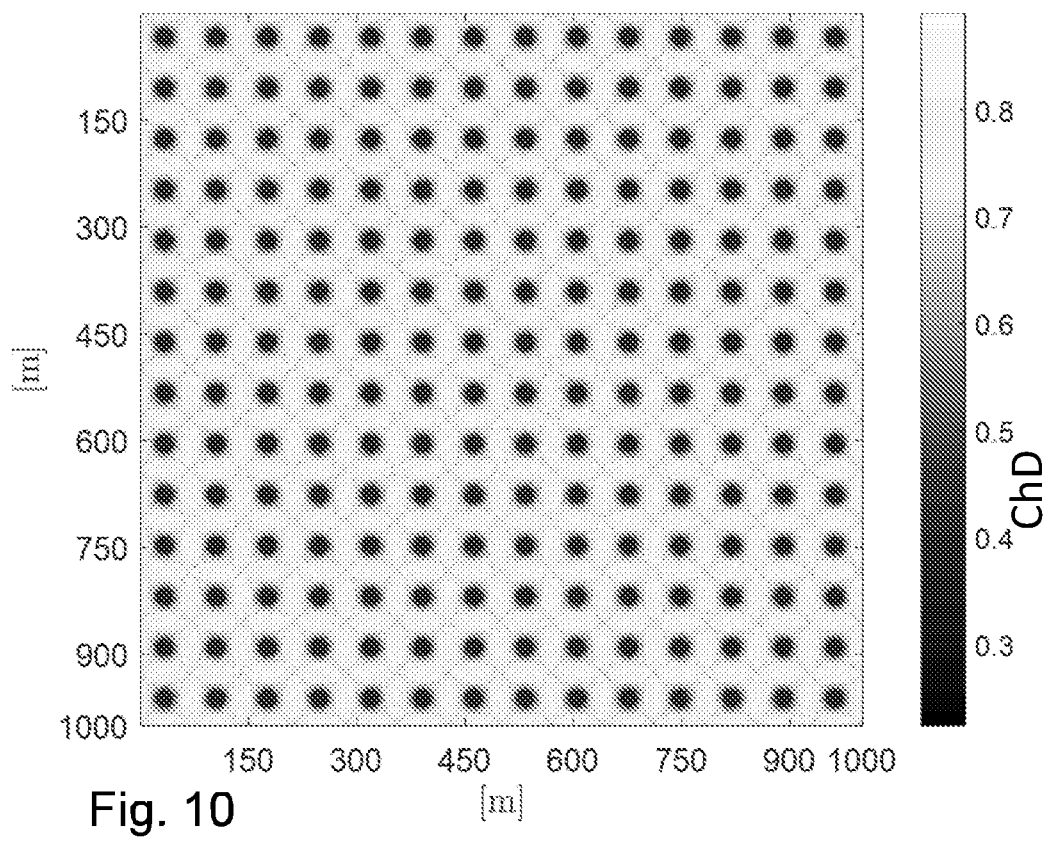
FIG. 10 schematically illustrates an example of a distribution of the channel hardening degree over an area of 1 km2.

A three-slope model is used for the path loss: the path loss exponent equals 3.5 if distance between the m-th AP and the k-th user (denoted by d$_{mk}$) is greater than d$_1$, equals 2 if d$_1 \geq$ d$_{mk} \geq$ d$_0$, and equals 0 if d$_{mk} \leq$ d$_0$ for some d$_0$ and d$_1$. When d$_{mk}$>d$_1$, the Hata-COST231 propagation model is employed. More precisely, the path loss in dB is given by $$PL_{mk} = \begin{cases} -L - 35\log_{10}d_{mk}, & \text{if } d_{mk} > d_1 \\ -L - 15\log_{10}d_1 - 20\log_{10}d_{mk}, & \text{if } d_0 < d_{mk} \leq d_1 \\ -L - 15\log_{10}d_1 - 20\log_{10}d_0, & \text{if } d_{mk} \leq d_0 \end{cases}$$

where $L = 46.3 + 33.9 \log_{10}(f) - 13.82 \log_{10}(h_{AP}) - (1.1 \log_{10}(f) - 0.7)h_u + (1.56 \log_{10}(f) - 0.8)$ The AP deployment map, and the heatmap of the corresponding channel hardening degree seen by the UE are shown in FIG. 9 and FIG. 10, respectively. FIG. 9 illustrates an example of grid deployment comprising 14×14 APs in an area of 1 km2, and FIG. 10 illustrates the distribution of the channel hardening degree over an area of 1 km2. In this simulation, it is assumed that roughly 200 APs (i.e., 196) are deployed as regular grid (14×14) over an area of 1 km².

The channel hardening degree (ChD) is the ratio between the instantaneous channel gain and its average. It can be analytically defined as $$ChD = 1 - \frac{\text{Var}\left\{\sum_{m=1}^{M} |g_{mk}|^2\right\}}{\left(E\left\{\sum_{m=1}^{M} |g_{mk}|^2\right\}\right)^2}$$

where g$_{mk}$ represents the scalar channel gain between the m-th AP and the k-th UE. The channel gain accounts for the small and large scale fading as listed in Table 1. The ChD is a real number between 0 and 1. The larger the ChD value is, the better the channel hardening is. In the results shown, every single value of channel hardening degree is obtained by averaging over thousands of realizations of the small-scale and shadow fading.

The power allocated to a given UE is mostly coming from the closest AP. Therefore, a UE placed very close to an AP effectively sees only that AP. Since the channel hardening degree is proportional to the number of APs effectively involved in the service of a given UE then the channel hardening degree is much lower (~0.2) when the UE gets closer to the AP, as shown in FIG. 10.

Figure 11:
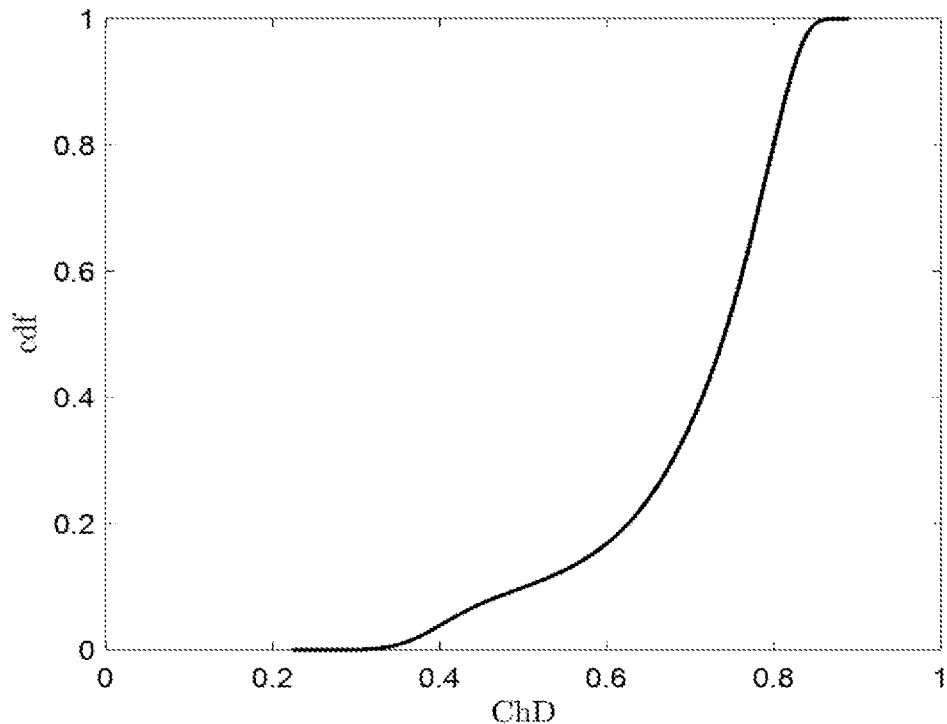
FIG. 11 schematically illustrates an example of the cumulative distribution function (cdf) of the channel hardening degree (ChD)

The cumulative distribution function (cdf) of the channel hardening degree (ChD), shown in FIG. 11, gives more insights about the distribution of the channel hardening degree given the random variable of the UE position in the deployment area. From here, it is evident that only 20% of the UEs experience a high value of channel hardening, i.e. larger than 0.8. Even in a scenario with ~200 APs, the channel hardening degree is relatively low (~0.7).

Next, an example to show the benefits provided by some embodiments disclosed herein with respect to the state-of-the-art is introduced. Consider a cell-free massive MIMO system, as described in Table 1, with M=196 APs and K=50 UEs, and the following case studies:

CASE 1, no downlink training (prior art): the coherence interval is structured as in FIG. 4. No downlink training is performed and all the active UEs rely only on statistical CSI to decode data. Then, $\tau_{UL_p}=50$, $\tau_{DL_p}=0$, $\tau_p=50$.

Figure 1:
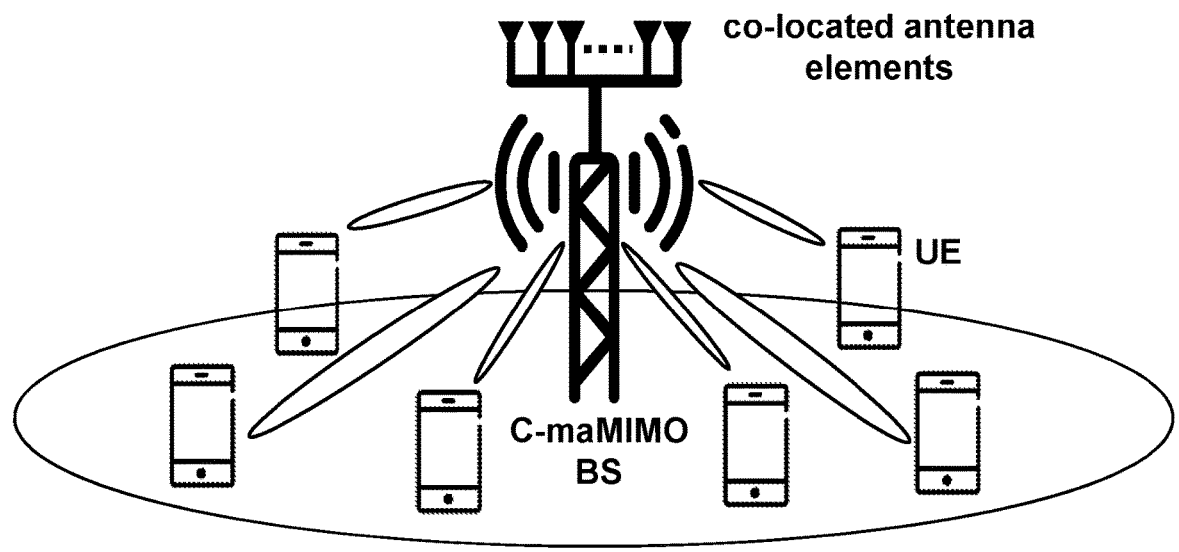
FIG. 1 schematically illustrates a centralized massive MIMO architecture.
Figure 2:
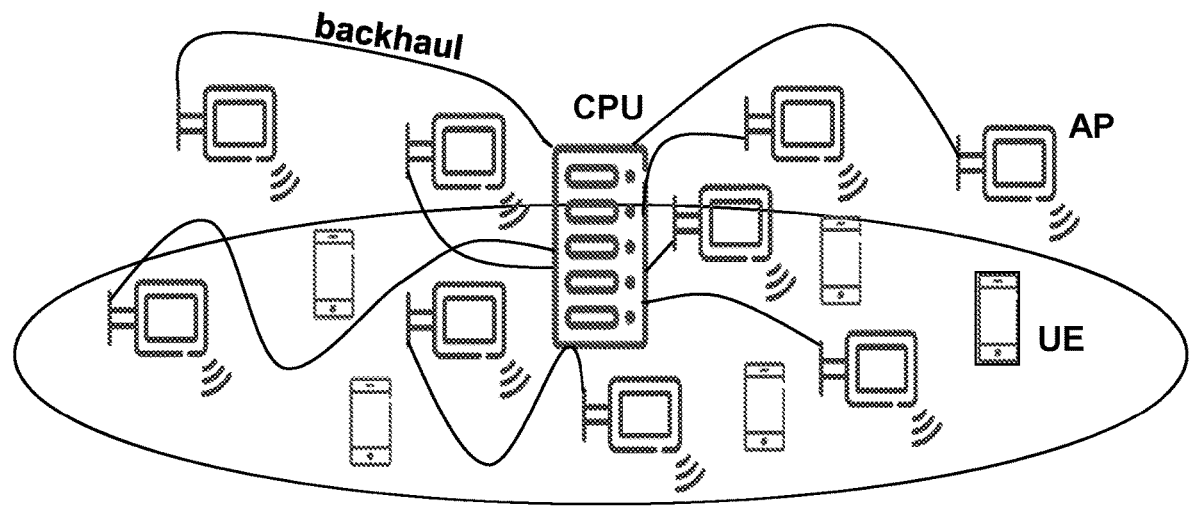
FIG. 2 schematically illustrates a distributed massive MIMO architecture.
Figure 3:
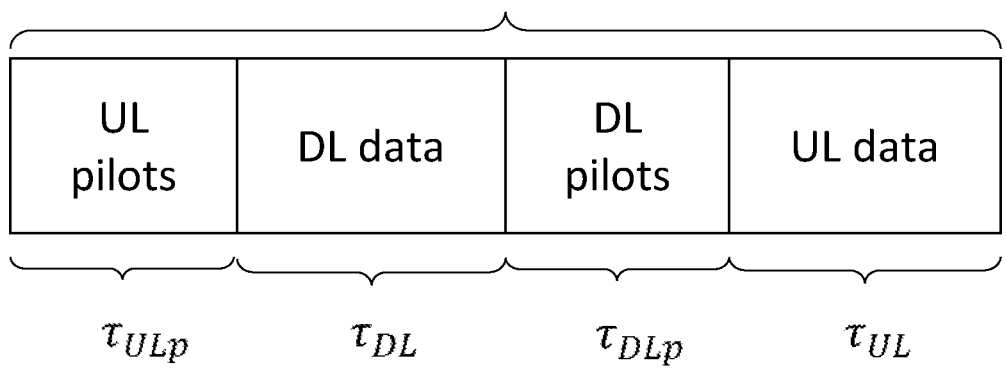
FIG. 3 schematically illustrates an example of a frame structure with a DL training phase.

CASE 2, downlink training (prior art): the coherence interval is structured as in FIG. 3. Each active UE receives an orthogonal downlink pilot from which it estimates the instantaneous CSI. Then $\tau_{UL_p}=\tau_{DL_p}=50$, $\tau_p=100$.

Figure 12:
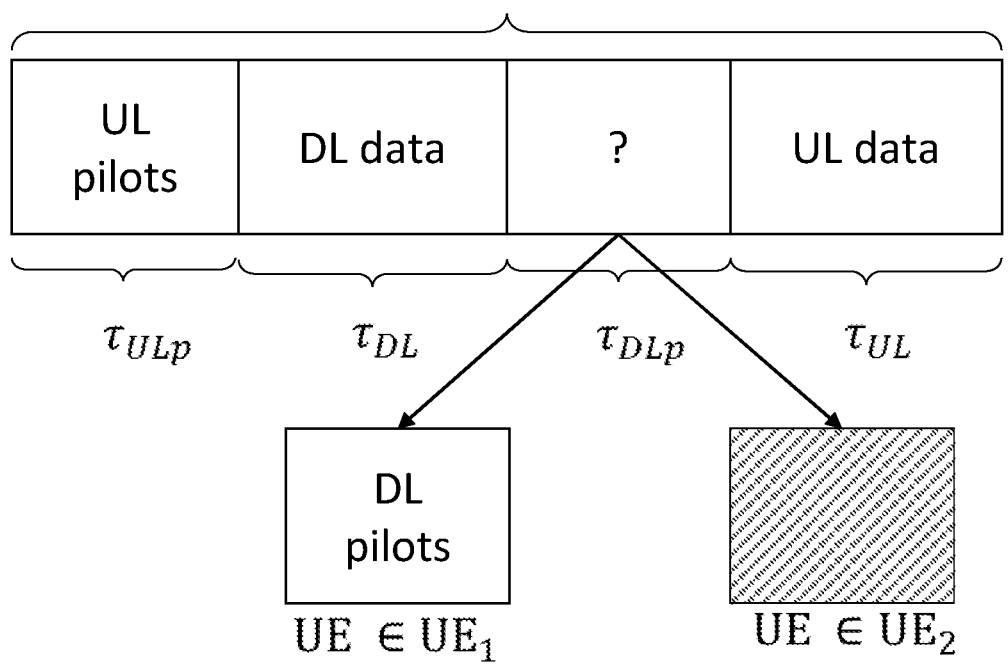
FIG. 12 schematically illustrates embodiments of a frame structure comprising a proposed downlink pilot assignment scheme.

CASE 3, proposed scheme: users ($UE_1$), e.g. the wireless device 120, having a pilot utility metric exceeding a predetermined threshold value are assigned with an orthogonal downlink pilot. All the remaining UEs ($UE_2$) rely only on statistical CSI. In a realistic scenario, the assignment of UL/DL resources would occur in a quasi-static fashion, since a dynamic re-allocation of pilots, frame by frame, would require a huge amount of control signaling to allow UEs to change UL/DL switching time. This also would introduce delay. Therefore, assume the following UL/DL resources assignment: $\tau_{UL_p}=50$, $\tau_{DL_p}=25$, $\tau_p=75$. For simplicity, also assume that the length of the coherence interval supports the mobility of all the active users, e.g. the wireless device 120, in the network, e.g. the wireless communications network 100. With the purpose to maximize the DL net sum throughput, the pilot utility metric is defined as the difference between the rate a given user, e.g. the wireless device 120, would achieve if an orthogonal DL pilot is assigned, and the achievable rate by relying only on UL pilots. These rates may be easily estimated from each AP by using the CSI knowledge. Therefore, according to the proposed scheme, only the 25 UEs out of 50 with the highest (rate difference) pilot utility metric will then receive an orthogonal DL pilot. The remaining 25 UEs will not have any allocated resource during the downlink training phase, in order to avoid further interference, as shown in FIG. 12. FIG. 12 illustrates an example of frame structure by using the proposed DL pilot assignment scheme.

Since the number of UEs that may be served is proportional to the time spent sending pilots, while the instantaneous sum throughput is proportional to the number of UEs served, it follows that a good rule to allocate the resources is spending approximately half of the frame on sending pilots, and half sending data. According to this rule, and the simulation scenario ($\tau=200$), the maximum number of symbols dedicated for the pilots is 100. Then case 2 is still admissible and all the UEs will be served in the current frame.

Figure 13:
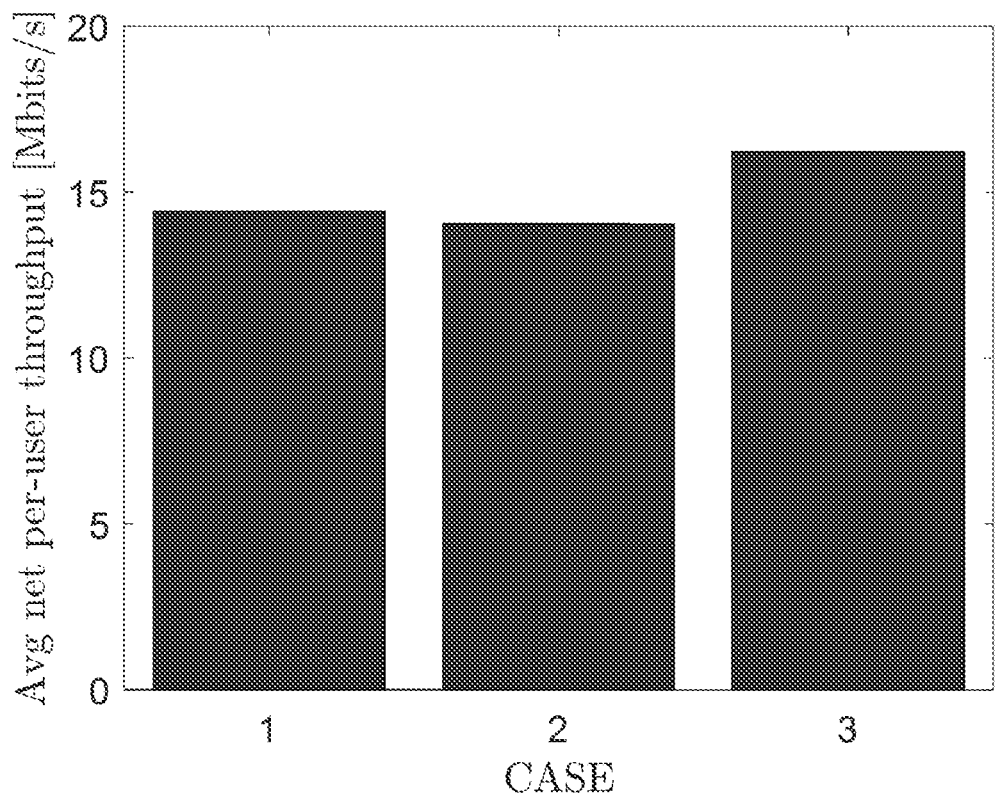
FIG. 13 schematically illustrates simulations of a proposed downlink assignment scheme (case 3) versus no downlink training (case 1) and versus downlink training according to the prior art (case 2)

The simulation results in FIG. 13 show that the proposed scheme, i.e. case 3, performs better than the prior art schemes in terms of DL average net per-user throughput, providing about 12% improvement over case 1 and about 16% improvement over case 2.

Figure 14:
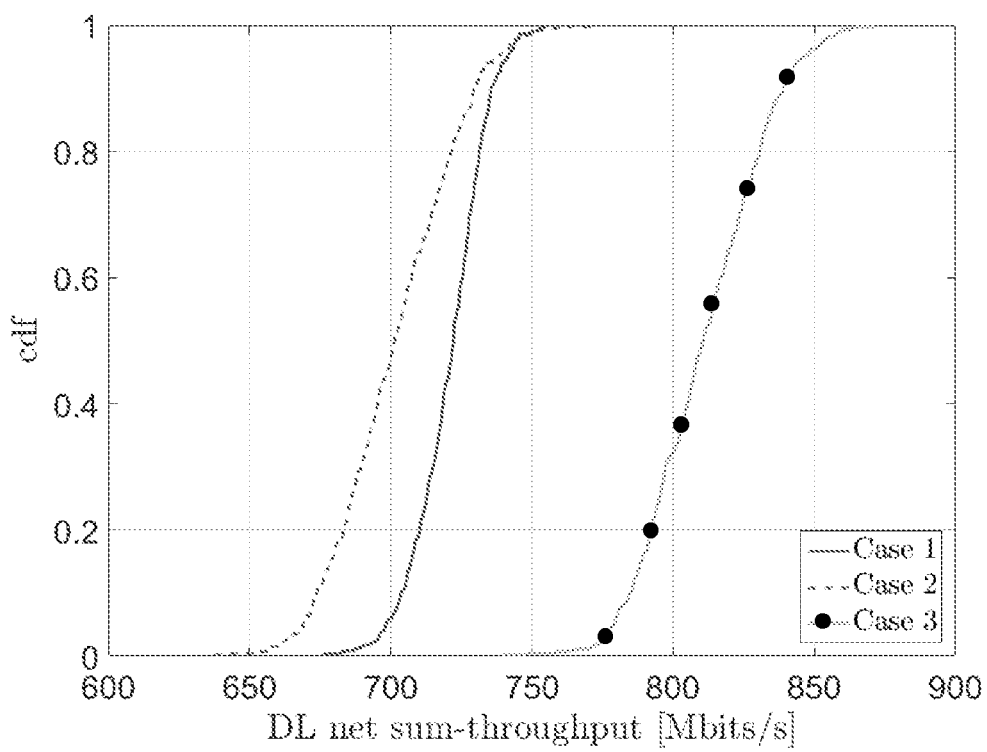
FIG. 14 schematically illustrates cumulative distributions functions versus the downlink net sum throughput for case 1, case 2 and case 3, respectively.

The gain introduced by the proposed scheme in terms of DL net sum throughput is illustrated from the cumulative distribution functions in FIG. 14. As seen, the proposed scheme provides a gain over case 1 by about 11%, 12% and 13% at the $5^{th}$ percentile, median and $90^{th}$ percentile, respectively. These gains are larger over case 2: 17% at the $5^{th}$ percentile, 16% at the median point and 15% at the $90^{th}$ percentile.

CONCLUSIONS

With respect Case 2, the proposed scheme according to some embodiments disclosed herein increases the system sum throughput and reduces the control signaling by assigning the DL pilots only to a subset of the active UEs. Moreover, the downlink training duration is shortened, allowing the support for shorter coherent intervals and UEs with higher mobility.

With respect Case 1, the proposed scheme according to some embodiments disclosed herein increases the system sum throughput by providing higher effective SINR to each UE. This gain also goes over the increased pilot overhead.

SOME EXEMPLIFYING EMBODIMENTS

An example of a proposed scheme according to some embodiments disclosed herein is illustrated from the signaling diagram in FIG. 15. In FIG. 15 the BS, e.g. the network node 110, estimates the Doppler spreads and the channel hardening degree, and determines a DL configuration to maximize the DL net-sum throughput. Thus all the UEs, e.g. the at least one wireless device 120, send own CSI via uplink pilot at the beginning of the coherence interval. The BS (that is all the APs, e.g. all the antenna elements, and the CPU) collects this information, and estimates the Doppler spread and the channel hardening degree of each UE, e.g. the at least one wireless device 120. Based on these information, the BS computes the pilot utility metric, and groups the UEs to two categories: (i) UEs requiring DL pilots, e.g. the wireless device 120, having a pilot utility metric above a predetermined threshold ($UE_1$ in FIG. 15); (ii) UEs not requiring DL pilots, having a pilot utility metric below a predetermined threshold ($UE_2$ in FIG. 15). Thus, a mobility condition is not needed to determine the pilot utility metric, and the pilot utility metric may be determined based on the estimated Doppler spread and the channel hardening degree only. As previously mentioned the Doppler spread is inversely proportional to how long the CSI may be considered to be valid. The number of DL pilots to assign may also depend on constraints due to the length of the coherence interval. Once these two subsets are defined, all the APs, e.g. the network node 110, send the DL pilot configuration conveying the message (it might be just one bit) if the DL pilots is used or not. Afterwards, the APs, e.g. the network node 110, perform data transmission. Lastly, the APs send the DL pilots only to the UEs, e.g. the wireless device 120, of the first category ($UE_1$). In this case, the pilot utility metric for the k-th UE is given by $$pu_k = wD_k + (1-w)(1-ChD_k),$$

where $D_k \in [0,1]$ is the Doppler spread value, and $w \in [0,1]$ is the weight to prioritize differently the user mobility and the channel hardening degree.

The $UE_1$ knows a priori the switching time from the DL data to the DL training phase since the frame structure is determined on large time scale. If a DL pilot is assigned, the UE estimates the downlink channel based on the DL pilot and demodulates the data on the remaining resources assigned to the downlink transmission. If a DL pilot is not assigned the UE assumes that the DL channel can be approximated by a constant and it demodulates the data on all resources assigned to the downlink transmission. No resources are assigned to $UE_2$ during the downlink training phase, in order to avoid data-to-pilot interference.

Figure 16:
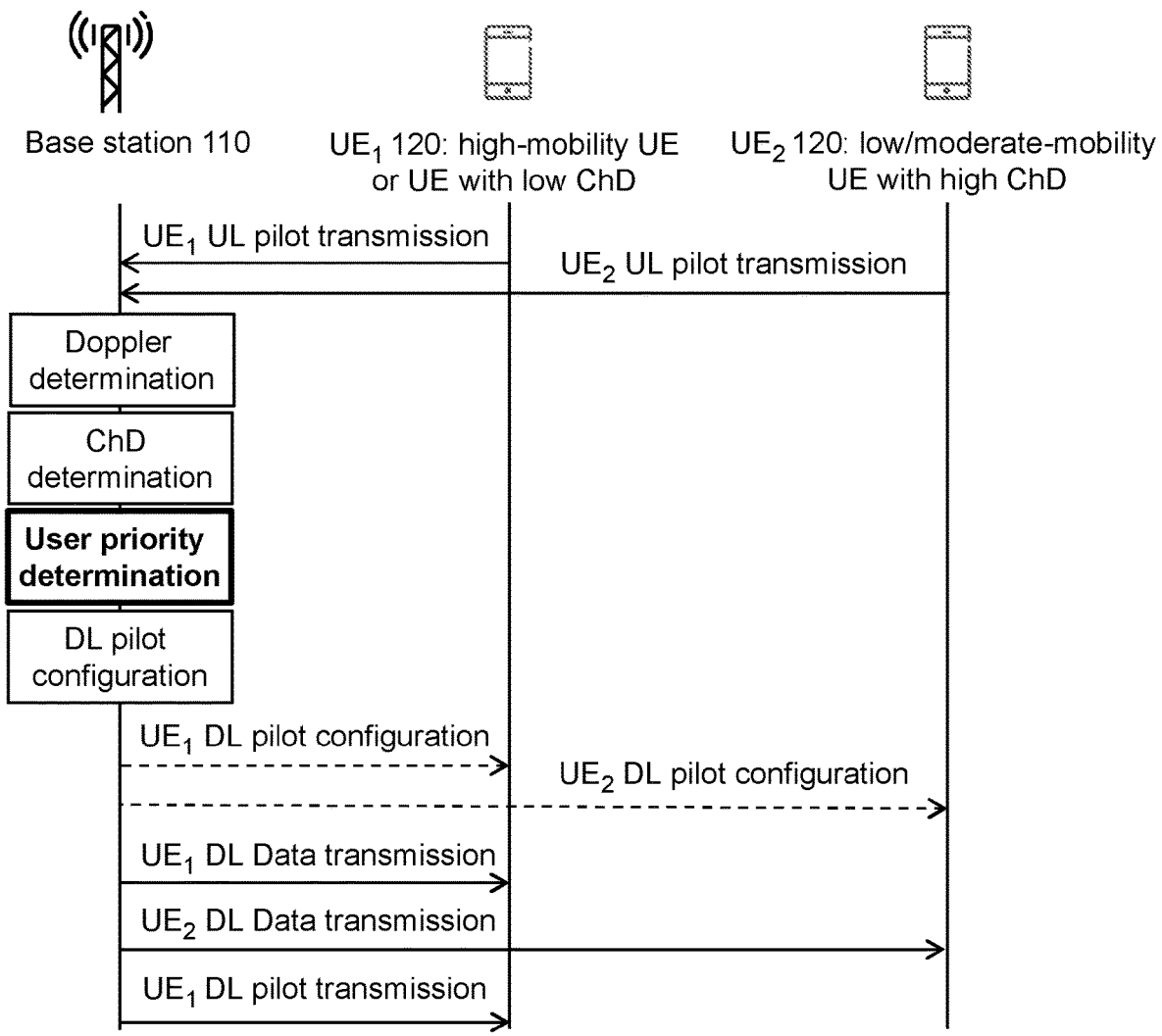
FIG. 16 is a schematic combined flow chart and signalling scheme of embodiments of a wireless communications network.

In some embodiments, the pilot utility metric may also account for the user priority, e.g. the priority between different wireless devices. This may require the BS, e.g. the network node 10, to perform a further action, named "user priority determination", as schematically shown in FIG. 16. In this case the pilot utility metric may be given by $$pu_k = wD_k + (1-w)(1-ChD_k) + \alpha_k, \text{ or}$$

$$pu_k = \alpha_k[wD_k + (1-w)(1-ChD_k)],$$

where $\alpha_k \in [0, 1]$ is the user priority.

Figure 17:
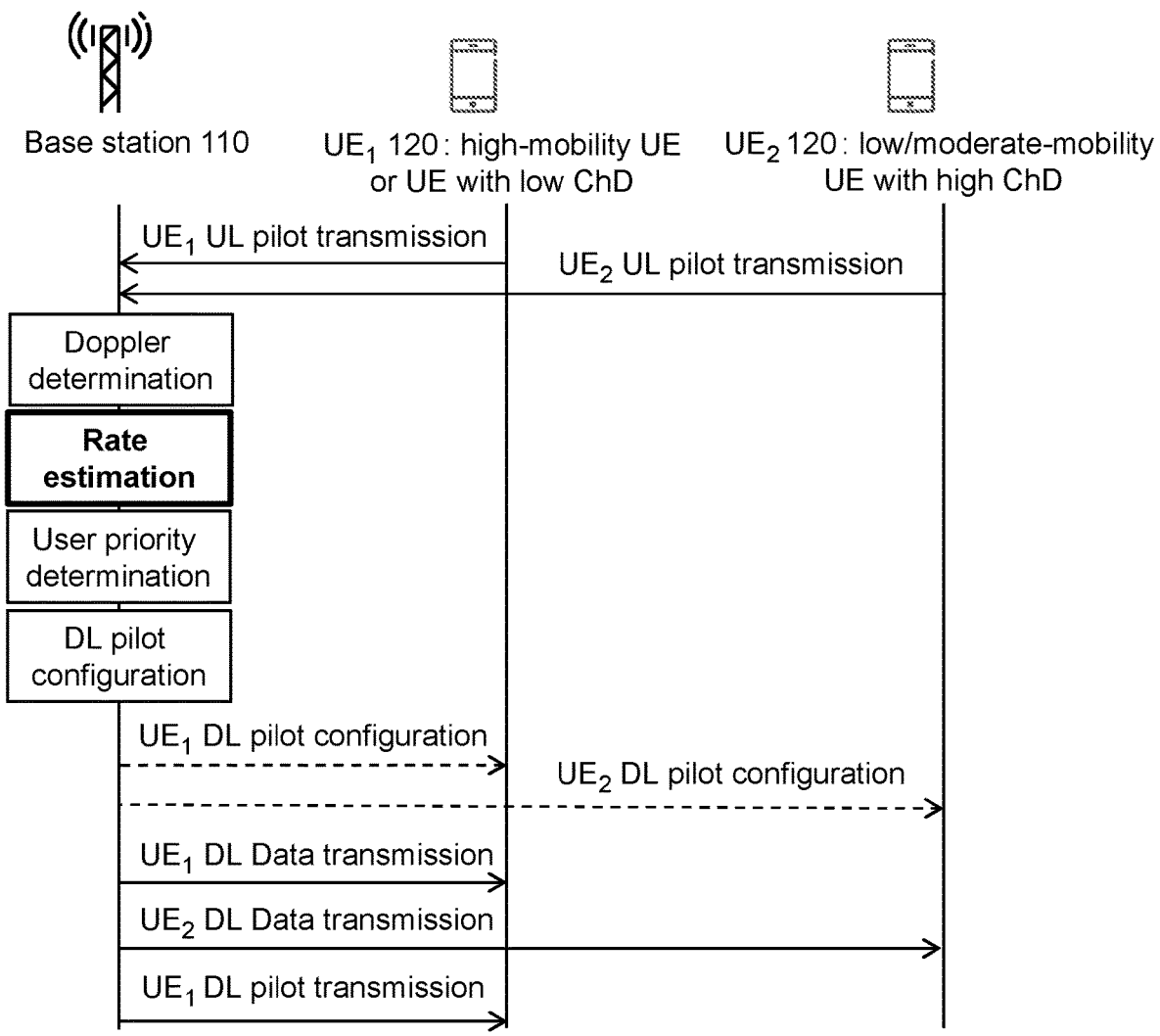
FIG. 17 is a schematic combined flow chart and signalling scheme of embodiments of a wireless communications network.

Let $R_k^{DLp}$, and $R_k^{ULp}$ be the rate the UE, e.g. the wireless device 120, would achieve by using the downlink pilot, and relying only on the statistical CSI (estimated from the uplink pilots), respectively. Let $T_k^{DLp}$, and $\tau_k^{ULp}$ be the corresponding throughputs, which take into account also the pilot overhead. These may be estimated during a "Rate estimation" action performed by the BS, e.g. the network node 110, which action replaces the "ChD determination" action in FIG. 16, by using the CSI knowledge at each AP. This is schematically illustrated in FIG. 17. The following pilot utility metrics 1. $pu_k = \alpha_k[wD_k + (1-w)(R_k^{DLp} - R_k^{ULp})]$ (absolute rate increase),
2. $pu_k = \alpha_k[wD_k + (1-w)(T_k^{DLp} - T_k^{ULp})]$ (absolute throughput increase),
3.

$$pu_k = \alpha_k\left[wD_k + (1-w)\left(\frac{R_k^{DLp} - R_k^{ULp}}{R_k^{DLp}}\right)\right] \text{(relative rate increase)},$$

4.

$$pu_k = \alpha_k\left[wD_k + (1-w)\left(\frac{T_k^{DLp} - T_k^{ULp}}{T_k^{DLp}}\right)\right] \text{(relative throughput increase)},$$

5. $pu_k = \alpha_k [wD_k + (1-w)(R_k^{ULp})^{-1}]$ (low-rate prioritization), are valid alternatives to those ones defined earlier. In particular, the absolute rate increase metric has been used in the simulation results in the simulations previously described, assuming w=0, and $\alpha_k = 1 \: \forall k \in K$, that is all the users, e.g. all wireless devices, have the same priority and mobility.

Some example Embodiments numbered 1-10 are described below. The following embodiments refer among other things to FIG. 6, FIG. 7A, FIG. 7B, FIG. 8A and FIG. 8B.

Embodiment 1

A method performed by a network node (110) e.g. for downlink pilot assignment and transmission, wherein the network node (110) comprises a plurality of antenna elements distributed over an area, wherein the network node (110) and at least one wireless device (120) are operating in a wireless communications network (100), and wherein the method comprises:
  determining or estimating (201) a respective channel condition, e.g. a respective Channel State Information, and/or a respective channel hardening degree for the at least one wireless device (120);
  determining or estimating (202) a respective mobility condition for the at least one wireless device (120);
  based on one or more out of: the determined/estimated respective channel condition, the determined/estimated respective channel hardening degree and the determined/estimated respective mobility condition, determining or obtaining (203) a respective pilot utility metric for the at least one wireless device (120); and
  assigning (204) a respective downlink pilot to at least one wireless device out of the at least one wireless devices (120) having a respective pilot utility metric exceeding a predetermined threshold value, e.g. transmitting (204), to each wireless device out of the at least one wireless devices (120), a pilot configuration indicating whether or not a respective downlink pilot is assigned, wherein at least one wireless device out of the at least one wireless device (120) having a respective pilot utility metric exceeding a predetermined threshold value is assigned a respective downlink pilot; and
  transmitting (205), to the at least one wireless device out of the at least one wireless devices (120), data and possibly an assigned respective downlink pilot using the configured pilot configuration.

Embodiment 2

The method according to embodiment 1, wherein the network node (110) is a Distributed Massive MIMO, D-maMIMO, network node, e.g. a D-maMIMO base station.

Embodiment 3

The method according to any of the embodiments 1-2, wherein the determining or obtaining (203) of the respective pilot utility metric for the at least one wireless device (120), further comprises:
  determining or obtaining the pilot utility metric based on a priority for the wireless device, which priority indicates whether or not the wireless device is to be prioritised when assigning a respective downlink pilot to the at least one wireless device (120).

Embodiment 4

A method performed by a wireless device (120) e.g. for downlink pilot assignment, wherein the wireless device (120) and a network node (110) are operating in a wireless communications network (100), wherein the network node (110) comprises a plurality of antenna elements distributed over an area, and wherein the method comprises:
  receiving (401), from the network node (110), an assignment of a downlink pilot, e.g. receiving a pilot configuration indicating whether or not a downlink pilot is assigned;
  receiving (402), from the network node (110), data and possibly an assigned downlink pilot;
  when an assigned downlink pilot is received, determining or estimating (403) a downlink channel based on the received downlink pilot, and demodulating (404) the received data; and
  in absence of a received assigned downlink pilot, e.g. when no downlink pilot is received, e.g. when no downlink pilot is assigned is assigned to the wireless device (120), estimating (405) a downlink channel as a constant and demodulating (406) the received data.

Embodiment 5

A computer program comprising instructions, which when executed by a processor, causes the processor to perform actions according to any of the embodiments 1-4.

Embodiment 6

A carrier comprising the computer program of embodiment 5, wherein the carrier is one of an electronic signal, an optical signal, an electromagnetic signal, a magnetic signal, an electric signal, a radio signal, a microwave signal, or a computer-readable storage medium.

Embodiment 7

A network node (110) e.g. for downlink pilot assignment and transmission, wherein the network node (110) comprises a plurality of antenna elements distributed over an area, wherein the network node (110) and at least one wireless device (120) are configured to operate in a wireless communications network (100), and wherein the network node is configured to:
determine or estimate a respective channel condition, e.g. a respective Channel State Information, and a respective channel hardening degree for the at least one wireless device (120), e.g. by means of a determining module (303) or an estimating module (304) in the network node (110);
determine or estimate a respective mobility condition for the at least one wireless device (120), e.g. by means of the determining module (303) or the estimating module (304) in the network node (110);
determine or obtain a respective pilot utility metric for the at least one wireless device (120), based on one or more out of: the determined/estimated respective channel condition, the determined/estimated respective channel hardening degree and the determined/estimated respective mobility condition, e.g. by means of the determining module (303) or an obtaining module (305);
assign a respective downlink pilot to at least one wireless device out of the at least one wireless devices (120) having a respective pilot utility metric exceeding a predetermined threshold value, e.g. transmit, to each wireless device out of the at least one wireless devices (120), a pilot configuration indicating whether or not a respective downlink pilot is assigned, wherein at least one wireless device out of the at least one wireless device (120) having a respective pilot utility metric exceeding a predetermined threshold value is assigned a respective downlink pilot. This may be performed by an assigning module (306) or a transmitting module (302) in the network node (110); and
transmit, to the at least one wireless device out of the at least one wireless devices (120), data and possibly an assigned respective downlink pilot using the configured pilot configuration, e.g. by means of the transmitting module (302).

Embodiment 8

The method according to embodiment 7, wherein the network node (110) is a Distributed Massive MIMO, D-maMIMO, network node, e.g. a D-maMIMO base station.

Embodiment 9

The method according to any of the embodiments 7-8, wherein the wherein the network node is configured to determine or obtain the respective pilot utility metric for the at least one wireless device (120), by further being configured to:
determine or obtain the pilot utility metric based on a priority for the wireless device, which priority indicates whether or not the wireless device is to be prioritised when assigning a respective downlink pilot to the at least one wireless device (120).

Embodiment 10

A wireless device (120) e.g. for downlink pilot assignment, wherein the wireless device (120) and a network node (110) are configured to operate in a wireless communications network (100), wherein the network node (110) comprises a plurality of antenna elements distributed over a wide area, and wherein the wireless device (120) is configured to:
receive, from the network node (110), an assignment of a downlink pilot, e.g. receive a pilot configuration indicating whether or not a downlink pilot is assigned, e.g. by means of a receiving module (501) in the wireless device (120);
receive, from the network node (110), data and possibly an assigned downlink pilot, e.g. by means of the receiving module (501);
when an assigned downlink pilot is received, determine or estimate a downlink channel based on the received downlink pilot, e.g. by means of an determining/estimating module (504) in the wireless device (120), and demodulate the received data on, e.g. by means of a demodulating module (505) in the wireless device (120); and
in absence of a received assigned downlink pilot, e.g. when no downlink pilot is received, e.g. when no downlink pilot is assigned to the wireless device (120), estimate a DL channel as a constant, e.g. by means of the estimating module (504) in the wireless device (120), and demodulate the received data, e.g. by means of the demodulating module (505) in the wireless device (120).

Further Extensions and Variations

Figure 18:
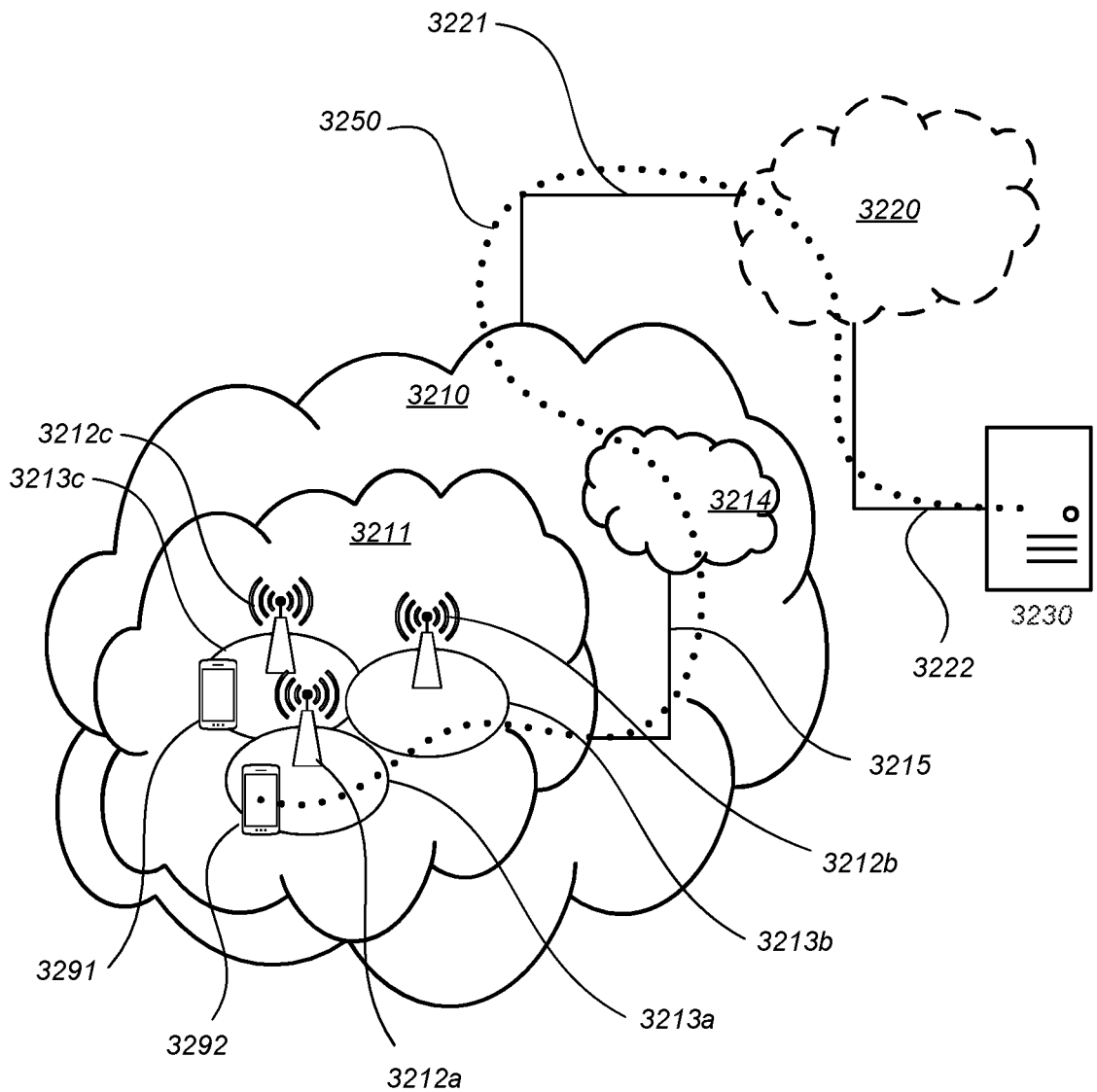
FIG. 18 schematically illustrates a telecommunication network connected via an intermediate network to a host computer.

With reference to FIG. 18, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 18 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 19. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 19) served by the base station 3320. The communication interface 3326 may be configured to facilitate a connection 3360 to the host computer 3310. The connection 3360 may be direct or it may pass through a core network (not shown in FIG. 19) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 19:
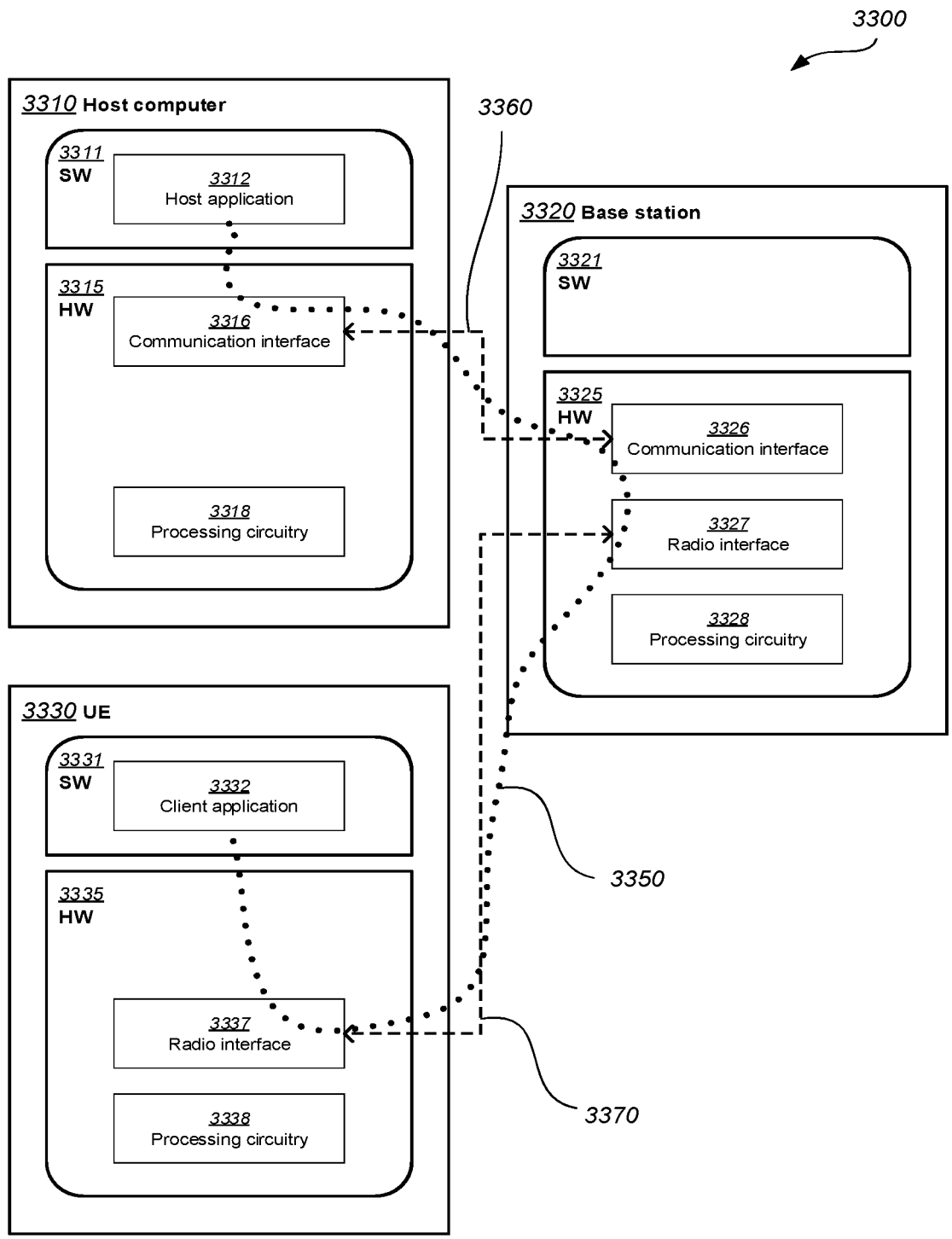
FIG. 19 is a generalized block diagram of a host computer communicating via a base station with a user equipment over a partially wireless connection.

It is noted that the host computer 3310, base station 3320 and UE 3330 illustrated in FIG. 19 may be identical to the host computer 3230, one of the base stations 3212a, 3212b, 3212c and one of the UEs 3291, 3292 of FIG. 18, respectively. This is to say, the inner workings of these entities may be as shown in FIG. 19 and independently, the surrounding network topology may be that of FIG. 18.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 20, 21:
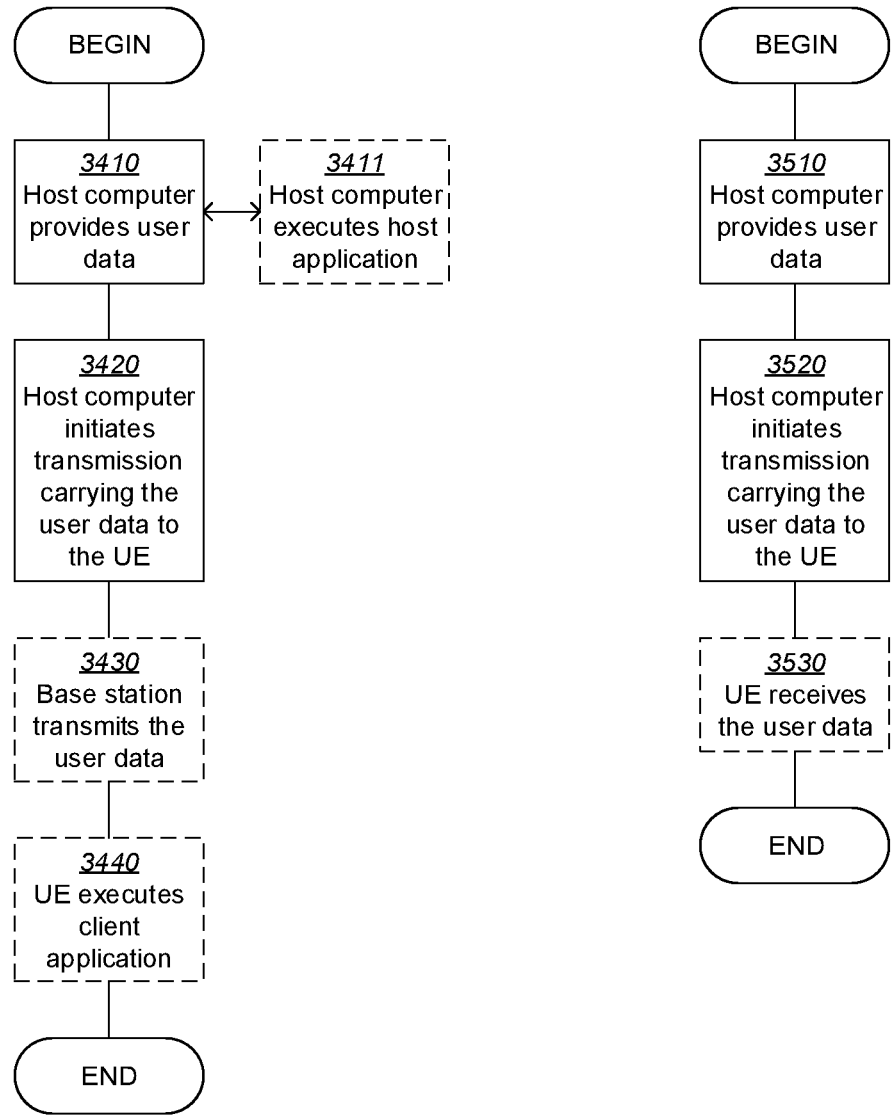

FIGS. 18 and 19 and the corresponding text are about a downstream aspect of the radio-related invention, while FIGS. 20 and 21 and the corresponding text discuss an upstream aspect.

FIG. 20 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 20 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 21 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 22 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 22 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 23 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

Abbreviation Explanation

AP Access Point
BS Base Station
C-maMIMO Centralized Massive MIMO
CB Conjugate Beamforming
ChD Channel Hardening Degree
CPU Central Process Unit
CSI Channel State Information
D-maMIMO Distributed Massive MIMO
DL Downlink
Independent and identically distributed
MIMO Multiple-Input Multiple-Output
MRT Maximum Ratio Transmission
SINR Signal-to-Interference-plus-Noise Ratio
TDD Time Division Duplex
UE User Equipment
UL Uplink

The invention claimed is:

1. A method, performed by a network node, for downlink pilot signal assignment and transmission, and for data transmission, wherein the network node has a plurality of antenna elements distributed over an area, wherein the network node and at least one wireless device are operating in a wireless communications network; the method comprising the network node:
    determining a respective Channel State Information (CSI) and/or a respective channel hardening degree for the at least one wireless device based on an uplink pilot signal received from the at least one wireless device;
    obtaining a respective pilot utility metric for the at least one wireless device based on the determined respective CSI, the determined respective channel hardening degree, and/or a determined respective mobility condition for the at least one wireless device;
    assigning a respective downlink pilot signal to at least one wireless device out of the at least one wireless devices having a respective pilot utility metric exceeding a predetermined threshold value; and
    transmitting data to the at least one wireless device out of the at least one wireless devices.

2. The method of claim 1, further comprising grouping, based on the obtained respective pilot utility metric for the at least one wireless devices, each one of the at least one wireless devices into:
    a first group of wireless devices which are to be assigned a respective downlink pilot signal; or
    a second group of wireless devices which are not requiring a respective downlink pilot signal.

3. The method of claim 1, wherein the assigning of the respective downlink pilot signal comprises transmitting, to each wireless device out of the at least one wireless devices, a pilot configuration indicating whether or not a respective downlink pilot signal is assigned.

4. The method of claim 1, wherein the obtaining of the respective pilot utility metric for the at least one wireless device comprises:
    obtaining the pilot utility metric as $puk=w\,Dk+(1-w)(1-ChDk)$;
    wherein $Dk \in [0,1]$ is a Doppler spread value, $w \in [0,1]$ is a weight to prioritize differently between user mobility and the channel hardening degree (ChD), and k indicates which one out of the k wireless devices operating in the wireless communications network for which the pilot utility metric puk is valid.

5. The method of claim 1, wherein the obtaining of the respective pilot utility metric for the at least one wireless device comprises obtaining the pilot utility metric based on a priority for the wireless device, which priority indicates whether or not the wireless device is to be prioritized when assigning a respective downlink pilot signal to the at least one wireless device.

6. The method of claim 5, wherein the obtaining of the respective pilot utility metric for the at least one wireless device comprises:
    obtaining the pilot utility metric as:

$puk=wDk+(1-w)(1-ChDk)+\alpha k;$ or $puk=\alpha k((wDk+(1-w)(1-ChDk));$ wherein $Dk \in [0,1]$ is a Doppler spread value, $w \in [0,1]$ is a weight to prioritize differently between user mobility and the Channel hardening Degree (ChD) $a \in [0,1]$ is a priority for the wireless device, and k indicates which one out of the k wireless devices operating in the wireless communications network for which the pilot utility metric puk is valid.

7. The method of claim 1, wherein the obtaining of the respective pilot utility metric for the at least one wireless device comprises:
    obtaining the pilot utility metric as one out of:

$puk=\alpha k(wDk+(1-w)(Rk^{DLp}-Rk^{ULp}));$ $puk=\alpha k(wDk+(1-w)(Tk^{DLp}-Tk^{ULp}));$ $puk=\alpha k(wDk+(1-w)(\{Rk^{DLp}-Rk^{ULp}\}/Rk^{DLp}));$ $puk=\alpha k(wDk+(1-w)(\{Tk^{DLp}-Tk^{ULp}\}/Tk^{DLp}));$ and $puk=\alpha k(wDk+((1-w)/Rk^{ULp}));$ wherein $Dk \in [0,1]$ is a Doppler spread value, $w \in [0,1]$ is a weight giving a relative importance of a user based mobility component and a channel state dependent component, $Rk^{DLp}$ is a rate the wireless device k would achieve by using the respective downlink pilot signal DLp, $Rk^{ULp}$ is a rate the wireless device would achieve when the network node only relies on CSI estimated from an uplink pilot signal ULp received from the wireless device, $Tk^{DLp}$ is a throughput the wireless device k would achieve by using the respective downlink pilot signal DLp, $Tk^{ULp}$ is a throughput the wireless device would achieve when the network node only relies on CSI estimated from an uplink pilot signal ULp received from the wireless device, and k indicates which one out of the k wireless devices operating in the wireless communications network for which the pilot utility metric puk is valid.

8. A method, performed by a wireless device, for receiving and demodulating data, wherein the wireless device and a network node are operating in a wireless communications network, wherein the network node has a plurality of antenna elements distributed over an area, and wherein the method comprises the wireless device:
    receiving, from the network node, an assignment of a downlink pilot, indicating whether or not a respective downlink pilot signal is assigned to the wireless device;
    receiving data from the network node;
    when an assigned downlink pilot signal is received, estimating a downlink channel based on the received downlink pilot signal, and demodulating the received data using the estimated downlink channel; and
    in absence of a received assigned downlink pilot signal, estimating a downlink channel as a constant and demodulating the received data using the constant as the estimate of the downlink channel.

9. The method of claim 8, wherein, when the assigned downlink pilot signal is received:
the estimating of the downlink channel comprises estimating instantaneous CSI of the downlink channel based on the received downlink pilot signal; and
the demodulating of the received data using the estimated downlink channel comprises demodulating the received data using the estimated instantaneous CSI.

10. The method of claim 8, wherein, in absence of the received assigned downlink pilot signal, the demodulating of the received data comprises demodulating the received data using statistical CSI.

11. A network node for downlink pilot signal assignment and transmission, and for data transmission; wherein the network node and at least one wireless device are configured to operate in a wireless communications network; the network node comprising:
a plurality of antenna elements distributed over an area;
processing circuitry configured to cause the network node to:
determine a respective Channel State Information (CSI) and/or a respective channel hardening degree for the at least one wireless device based on an uplink pilot signal received from the at least one wireless device;
obtain a respective pilot utility metric for the at least one wireless device based on: the determined respective CSI, the determined respective channel hardening degree, and/or a determined respective mobility condition;
assign a respective downlink pilot signal to at least one wireless device out of the at least one wireless devices having a respective pilot utility metric exceeding a predetermined threshold value; and
transmit data to the at least one wireless device out of the at least one wireless devices.

12. The network node of claim 11, wherein the processing circuitry is configured to cause the network node to group, based on the obtained respective pilot utility metric for the at least one wireless devices, each one of the at least one wireless devices into:
a first group of wireless devices which are to be assigned a respective downlink pilot signal; or
a second group of wireless devices which are not requiring a respective downlink pilot signal.

13. The network node of claim 11, wherein the processing circuitry is configured to cause the network node to transmit, to each wireless device out of the at least one wireless devices, a pilot configuration indicating whether or not a respective downlink pilot signal is assigned.

14. The network node of claim 11, wherein the processing circuitry is configured to cause the network node to obtain the respective pilot utility metric for the at least one wireless device by:
obtaining the pilot utility metric as $puk=wDk+(1-w)(1-ChDk)$;
wherein $Dk \in [0,1]$ is a Doppler spread value, $w \in [0,1]$ is a weight to prioritize differently between user mobility and the channel hardening degree (ChD), and k indicates which one out of the k wireless devices operating in the wireless communications network for which the pilot utility metric puk is valid.

15. The network node of claim 11, wherein the processing circuitry is configured to cause the network node to obtain the respective pilot utility metric for the at least one wireless device by obtaining the pilot utility metric based on a priority for the wireless device, which priority indicates whether or not the wireless device is to be prioritized when assigning a respective downlink pilot signal to the at least one wireless device.

16. The network node of claim 15, wherein the processing circuitry is configured to cause the network node to obtain the respective pilot utility metric for the at least one wireless device by:
obtaining the pilot utility metric as:

$$puk=wDk+(1-w)(1-ChDk)+\alpha k; \text{ or}$$

$$puk=\alpha k((wDk+(1-w)(1-ChDk));$$

wherein $Dk \in [0,1]$ is a Doppler spread value, $w \in [0,1]$ is a weight to prioritize differently between user mobility and the Channel hardening Degree (ChD), $\alpha k \in [0,1]$ is a priority for the wireless device, and k indicates which one out of the k wireless devices operating in the wireless communications network for which the pilot utility metric puk is valid.

17. The network node of claim 11, wherein the processing circuitry is configured to cause the network node to obtain the respective pilot utility metric for the at least one wireless device, by:
obtaining the pilot utility metric as one out of:

$$puk=\alpha k(wDk+(1-w)(Rk^{DLp}-Rk^{ULp}));$$

$$puk=\alpha k(wDk+(1-w)(Tk^{DLp}-Tk^{ULp}));$$

$$puk=\alpha k(wDk+(1-w)(\{Rk^{DLp}-Rk^{ULp}\}/Rk^{DLp}));$$

$$puk=\alpha k(wDk+(1-w)(\{Tk^{DLp}-Tk^{ULp}\}/Tk^{DLp})); \text{ and}$$

$$puk=\alpha k(wDk+((1-w)/Rk^{ULp}));$$

wherein $Dk \in [0,1]$ is a Doppler spread value, $w \in [0,1]$ is a weight giving a relative importance of a user based mobility component and a channel state dependent component, $Rk^{DLp}$ is a rate the wireless device k would achieve by using the respective downlink pilot signal DLp, $Rk^{ULp}$ is a rate the wireless device would achieve when the network node only relies on CSI estimated from an uplink pilot signal ULp received from the wireless device, $Tk^{DLp}$ is a throughput the wireless device k would achieve by using the respective downlink pilot signal DLp, $Tk^{ULp}$ is a throughput the wireless device would achieve when the network node only relies on CSI estimated from an uplink pilot signal ULp received from the wireless device, and k indicates which one out of the k wireless devices operating in the wireless communications network for which the pilot utility metric puk is valid.

18. A wireless device for receiving and demodulating data, wherein the wireless device and a network node are configured to operate in a wireless communications network, wherein the network node has a plurality of antenna elements distributed over an area; wherein the wireless device comprises:
processing circuitry;
memory containing instructions executable by the processing circuitry whereby the wireless device is operative to:
receive, from the network node, an assignment of a downlink pilot indicating whether or not a respective downlink pilot signal is assigned to the wireless device;
receive data from the network node;

when an assigned downlink pilot signal is received, estimate a downlink channel based on the received downlink pilot signal, and demodulate the received data using the estimated downlink channel; and in absence of a received assigned downlink pilot signal, estimate a downlink channel as a constant and demodulate the received data using the constant as the estimate of the downlink channel.

19. The wireless device of claim 18, wherein the instructions are such that the wireless device is operative to, when the assigned downlink pilot signal is received:

estimate the downlink channel by estimating instantaneous CSI of the downlink channel based on the received downlink pilot signal; and demodulate the received data using the estimated instantaneous CSI.

20. The wireless device of claim 18, wherein the instructions are such that the wireless device is operative to demodulate the received data using statistical CSI in the absence of the received assigned downlink pilot signal.

* * * * *